(12) United States Patent
Shi et al.

(10) Patent No.: US 12,717,557 B2
(45) Date of Patent: Aug. 25, 2026

(54) SYSTEMS AND METHODS FOR SYNTHESIZING CODE FROM INPUT AND OUTPUT EXAMPLES

(71) Applicant: Google LLC, Mountain View, CA (US)

(72) Inventors: Kensen Shi, Palo Alto, CA (US); Rishabh Singh, San Jose, CA (US); David J. Bieber, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 303 days.

(21) Appl. No.: 18/529,387

(22) Filed: Dec. 5, 2023

(65) Prior Publication Data

US 2024/0211218 A1 Jun. 27, 2024

Related U.S. Application Data

(63) Continuation of application No. 18/165,047, filed on Feb. 6, 2023, now Pat. No. 11,875,139, which is a (Continued)

(51) Int. Cl.

*G06F 8/36* (2018.01)
*G06F 16/24* (2019.01)

(Continued)

(52) U.S. Cl.

CPC ................ *G06F 8/36* (2013.01); *G06F 16/24* (2019.01); *G06N 5/04* (2013.01); *G06N 20/00* (2019.01)

(58) Field of Classification Search

CPC ........................................................ G06F 8/36

See application file for complete search history.

(56) References Cited

U.S. PATENT DOCUMENTS

| | | | |
|---|---|---|---|
| 2009/0063479 A1 | 3/2009 | Millet et al. | |
| 2016/0171978 A1 | 6/2016 | Xu | |

(Continued)

FOREIGN PATENT DOCUMENTS

| | | | |
|---|---|---|---|
| CN | 102682065 A * | 9/2012 | |
| CN | 107506415 A * | 12/2017 | G06F 40/284 |
| EP | 3722968 A1 * | 10/2020 | G06F 16/254 |

OTHER PUBLICATIONS

Shi ("TF-Coder: Program Synthesis for Tensor Manipulations"), Jul. 2017 (Year: 2017).*

(Continued)

*Primary Examiner* — Jae U Jeon

(74) *Attorney, Agent, or Firm* — DORITY & MANNING P.A.

(57) ABSTRACT

The present disclosure provides systems and methods for synthesizing computer-readable code based on the receipt of input and output examples. A computing system in accordance with the disclosure can be configured to receive a given input and output, access and library of operations, and perform a search of a library of operations (e.g., transpose, slice, norm, etc.) that can be applied to the input. By applying the operations to the input and tracking the results, the computing system may identify an expression comprising one or a combination of operations that when applied to the input generates the output. In this manner, implementations of the disclosure may be used to identify one or more solutions that a user having access to the library of operations may use to generate the output from the input.

20 Claims, 9 Drawing Sheets

Related U.S. Application Data continuation of application No. 17/676,601, filed on Feb. 21, 2022, now Pat. No. 11,573,774, which is a continuation of application No. 16/929,467, filed on Jul. 15, 2020, now Pat. No. 11,256,485.

(60) Provisional application No. 62/874,756, filed on Jul. 16, 2019.

(51) Int. Cl.
*G06N 5/04* (2023.01)
*G06N 20/00* (2019.01)

(56) References Cited

U.S. PATENT DOCUMENTS

2017/0316307 A1 11/2017 Koster et al.
2018/0107724 A1* 4/2018 Ganjam ................ G06F 16/258
2018/0113873 A1* 4/2018 Gulwani ................ G06F 40/16
2018/0349477 A1 12/2018 Jaech et al.
2020/0334614 A1* 10/2020 Javaid .................. G06Q 10/109

OTHER PUBLICATIONS

Abadi et al., "TensorFlow: A System for Large-Scale Machine Learning", 12$^{th}$ Usenix Syposium on Operating Systems Design and Implementation, Nov. 2-4, 2016, Savannah, Georgia, United States, 21 pages.
Allamanis, "The Adverse Effects of Code Duplication in Machine Learning Models of Code", arXiv:1812.06469v1, Dec. 16, 2018, 8 pages.
Alur et al., "Syntax-Guided Synthesis", Formal Methods in Computer Aided Design, Oct. 20-23, 2013, Portland, Oregon, United States, 8 pages.
Balog et al., "DeepCoder: Learning to Write Programs", 5th International Conference on Learning Representations, Apr. 24-26, 2016, Toulon, France, 20 pages.
Bavishi et al., "AutoPandas: Neural-Backed Generators for Program Synthesis", Proceedings of the Association for Computing Machinery on Programming Languages, vol. 3, OOPSLA, Oct. 2019, Article 168, pp. 1-27.
Cadar et al., "KLEE: Unassisted and Automatic Generation of High-Coverage Tests for Complex Systems Programs", 8$^{th}$ Usenix Conference on Operating Systems Design and Implementation, Dec. 8-10, 2008, San Diego, California, United States, pp. 209-224.
Chen et al., "MXNet: A Flexible and Efficient Machine Learning Library for Heterogeneous Distributed Systems", arXiv:1512.01274v1, Dec. 3, 2015, 6 pages.
Cortes et al., "Support-Vector Networks", Machine Learning, vol. 20, No. 3, Sep. 1995, pp. 273-297.
Devlin et al., "RobustFill: Neural Program Learning under Noisy I/O", 34$^{th}$ International Conference on Machine Learning, Aug. 6-11, 2017, Sydney, Australia, 9 pages.
Feser et al., "Synthesizing Data Structure Transformations from Input-Output Examples", 36$^{th}$ Association for Computing Machinery SIGPLAN Conference on Programming Language Design and Implementation, Jun. 15-17, 2015, Portland, Oregon, United States, 11 pages.
Gulwani et al., "Program Synthesis", Foundations and Trends in Programming Language, vol. 4, Issue 1-2, 2017, pp. 1-136.
Gulwani et al., "Spreadsheet Data Manipulation Using Examples", Communications of the Association for Computing Machinery, vol. 55, No. 8, Aug. 2012, 9 pages.
Gulwani, Automating String Processing in Spreadsheets Using Input-Output Examples, 38$^{th}$ Association for Computing Machinery SIGPLAN-SIGACT Symposium on Principle of Programming Languages (PoPL '11), Jan. 26-28, 2011, Austin, Texas, United States, 13 pages.
Hardy, "Automatic Induction of LISP Functions", AISB'74: Proceedings of the 1$^{st}$ Summer Conference on Artificial Intelligence and Simulation of Behaviour, Amsterdam, The Netherlands, pp. 50-62.
Jones, "A Statistical Interpretation of Term Specificity and its Application in Retrieval", Journal of Documentation, vol. 28, No. 1, 1972, 9 pages.
King, "Symbolic Execution and Program Testing", Communications of the Association for Computing Machinery, vol. 19, No. 7, Jul. 1976, pp. 385-394.
Kingma et al., "ADAM: A Method for Stochastic Optimization", arXiv:1412.6980v1, Dec. 22, 2014, 9 pages.
Le et al., "FlashExtract: A Framework for Data Extraction by Examples", Association for Computing Machinery SIGPLAN Conference on Programming Language Design and Implementation (PLDI '14), Jun. 9-11, 2014, Edinburgh, United Kingdom, 12 pages.
Lecun et al., "Deep Learning", Nature, vol. 521, May 28, 2015, 9 pages.
Menon et al., "A Machine Learning Framework for Programming by Example", 30$^{th}$ International Conference on Machine Learning, Jun. 16-21, 2013, Atlanta, Georgia, United States, 9 pages.
Parisotto et al., "Neuro-Symbolic Program Synthesis", arXiv:1611.01855v1, Nov. 6, 2016, 14 pages.
Pascanu et al., "Understanding the Exploding Gradient Problem", arXiv:1211.5063v1, Nov. 21, 2012, 11 pages.
Paszke et al., "Automatic differentiation in PyTorch", 31$^{st}$ Conference on Neural Information Systems (NIPS 2017), Dec. 4-9, 2017, Long Beach, California, United States, 4 pages.
Pedregosa et al., "Scikit-learn: Machine Learning in Python", Journal of Machine Learning, vol. 12, 2011, pp. 2825-2830.
Polikarpova et al., "Program Synthesis from Polymorphic Refinement Types", arXiv:1510.08419v1, Apr. 21, 2016, 12 pages.
Schkufza et al., "Stochastic Superoptimization", Architectural Support for Programming Languages and Operating Systems (ASPLOS), Mar. 16-20, 2013, Houston, Texas, United States, 11 pages.
Shaw et al., "Inferring LISP Programs from Examples", 4$^{th}$ International Joint Conference on Artificial Intelligence, Sep. 3-8, 1975, Tbilisi, Georgia, United States, pp. 260-267.
Shi et al., "FrAngel: Component-based Synthesis with Control Structures", arXiv:1811.05175v2, Nov. 24, 2018, 30 pages.
Shin et al., "Synthetic Datasets for Neural Program Synthesis", 7$^{th}$ International Conference on Learning Representations, May 6-9, 2019, New Orleans, Louisiana, United States, 16 pages.
Singh et al., "Predicting a Correct Program in Programming by Example", 27$^{th}$ International Conference on Computer Aided Verification, Jul. 18-24, 2015, San Francisco, California, United States, pp. 398-414.
Singh et al., "Synthesizing Data-structure Manipulations from Storyboards", 19$^{th}$ Association for Computing Machinery SIGSOFT Symposium and the 13$^{th}$ European Conference on Foundations of Software Engineering (ESEC/FSE '11), Sep. 5-9, 2011, Szeged, Hungary, 11 pages.
Singh, "BlinkFill: Semi-supervised Programming by Example for Syntactic String Transformations", Proceedings of the VLDB Endowment, vol. 9, No. 10, Jun. 2016, pp. 816-827.
Smith et al., "MapReduce Program Synthesis", 37$^{th}$ Association for Computing Machinery SIGPLAN Conference on Programming Language Design and Implementations (PLDI), Jun. 13-17, 2016, Santa Barbara, California, United States, 12 pages.
Solar-Lezama et al., "Combinatorial Sketching for Finite Programs", 12$^{th}$ International Conference on Architectural Support for Programming Languages and Operating Systems (ASPLOS), Oct. 21-25, 2006, San Jose, California, United States, 12 pages.
Solar-Lezama, "Program Sketching", International Journal on Software Tools for Technology Transfer (STTT), vol. 15, 2013, pp. 475-795.
Udupa et al., "TRANSIT: Specifying Protocols with Concolic Snippets", Association for Computing Machinery SIGPLAN Conference on Programming Language Design and Implementation (PLDI '13), Jun. 16-19, 2013, Seattle, Washington, United States, 10 pages.
Van Rijsbergen, "Information Retrieval", Buttersworths, London, 1979, 153 pages.

(56) References Cited

OTHER PUBLICATIONS

Wang et al., "Synthesis of Data Completion Scripts using Finite Tree Automata", Proceedings of the Association for Computing Machinery on Programming Languages, vol. 1, Issue OOPSLA, 27 pages.
Wang et al., "Program Synthesis using Abstraction Refinement", Proceedings of the Association for Computing Machinery on Programming Languages, vol. 2, No. POPL, Article 63, Jan. 2018, 30 pages.
Yaghmazadeh et al., "Automated Migration of Hierarchical Data to Relational Tables using Programming-by-Example", Proceedings of the VLDB Endowment, vol. 11, No. 5, Aug. 2018, pp. 580-593.
Ye et al., "Sketch-Driven Regular Expression Generation from Natural Language and Examples", arXiv:1908.05848v1, Aug. 16, 2019, 17 pages.

* cited by examiner

SYSTEMS AND METHODS FOR SYNTHESIZING CODE FROM INPUT AND OUTPUT EXAMPLES

RELATED APPLICATIONS

This application is a continuation of U.S. Pat. No. 11,875,139, filed Feb. 6, 2023, which claims priority to and the benefit of U.S. Pat. No. 11,573,774, filed Feb. 21, 2023, which claims priority to and the benefit of U.S. Pat. No. 11,256,485, filed Jul. 15, 2020 which claims priority to and the benefit of U.S. Provisional Patent Application No. 62/874,756, filed Jul. 16, 2019. Each of U.S. Pat. Nos. 11,875,139, 11,573,774, 11,256,485, and U.S. Provisional Patent Application No. 62/874,756 are hereby incorporated by reference in their entirety.

FIELD

The present disclosure relates generally to machine learning. More particularly, the present disclosure relates to methods and systems for synthesizing computer-executable expressions from a library of operations based on the receipt of input and output datasets.

BACKGROUND

Programmers now have access to a large number of programming languages, as well as associated libraries, that can be used to develop computer executable code for solving different problems. Each library can include a plurality of performable operations, where each operation corresponds to or includes a function or other transformation that, when performed, alters an input to produce an output. As one example, TensorFlow is a popular machine learning library that enables development of machine learning programs and applications.

Due to this breadth of programming languages, it may be difficult to transfer solutions between programming languages. Additionally, certain programming languages may include built-in functions that are absent from other languages. Thus, it may be challenging for a developer who is fluent in one programming language to develop or even port code into a second language in which the developer is less fluent.

Furthermore, even for relatively experienced developers who have a strong understanding of the language in which they are working, it may be challenging to quickly identify the correct set of one or more performable operations that lead to a desired transformation. In particular, identifying relevant operations out of the potentially hundreds or more that exist (e.g., all symbols in a library) and composing them in a correct and efficient manner can be difficult for beginners and even experienced programmers. Thus, it is a common scenario that a developer has an understanding of the values and structures of the desired inputs and outputs but is unable to efficiently identify a sequence of one or more performable operations that, when applied to the desired input, produce the desired output.

Similarly to natural languages, programming languages can include redundancies (like synonyms in natural languages) that may have a similar effect or meaning but can differ in other aspects. For programming languages, some examples include execution time, input type(s), or other predefined aspects of the operation. Thus, programming languages may include several functions or combinations of functions that produce an equivalent transformation. For example, solving a linear algebra problem may include multiple function calls to derive the mathematic solution; alternatively, the solution could include calling a built-in function optimized for that language.

Needed in the art are methods to improve the ease of generation of computer-readable code and/or transferability of such code from one language to another. Such methods may also provide tools for increasing a developer's existing skill in a certain language or assisting the developer in learning new programming languages by way of automated assistance for code drafting or translation.

SUMMARY

Aspects and advantages of embodiments of the present disclosure will be set forth in part in the following description, or can be learned from the description, or can be learned through practice of the embodiments.

The present disclosure provides systems and methods for synthesizing computer-readable code based on the receipt of input and output examples. A computing system in accordance with the disclosure can be configured to receive a given input and output, access and library of operations, and perform a search of a library of operations (e.g., transpose, slice, norm, etc.) that can be applied to the input. By applying the operations to the input and tracking the results, the computing system may identify an expression comprising one or a combination of operations that when applied to the input generates the output. In this manner, implementations of the disclosure may be used to identify one or more solutions that a user having access to the library of operations may use to generate the output from the input.

One example aspect of the present disclosure is directed to computing systems and methods for performing the search that implement machine learning models configured to determine weights for the operations. The weights can be used to define different search strategies or objectives that can provide advantages to both users (e.g., by improving specificity) and providers (e.g., by reducing computation costs). As one example, the weights can be used to define or influence an order of searching within or among the plurality of performable operations in the context of, for example, a weighted enumerative search strategy.

Another example aspect of the present disclosure is directed to user interfaces for receiving the input and output examples (e.g., input and output tensors) and providing a solution such as a list of the performable expressions.

Another example aspect of the present disclosure is directed to education tools. Since implementations of the disclosure are not tied to a specific syntax and may operate on the basis of at least an input example and an output example, the systems and methods disclosed herein may be used to teach coding for various languages and/or applications.

Other aspects of the present disclosure are directed to various systems, apparatuses, non-transitory computer-readable media, user interfaces, and electronic devices. For example, various user interfaces can be provided which enable the user to input or otherwise provide the desired inputs and outputs and, in response, to receive one or more computer-executable expressions that transform the inputs to produce the outputs.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1A:
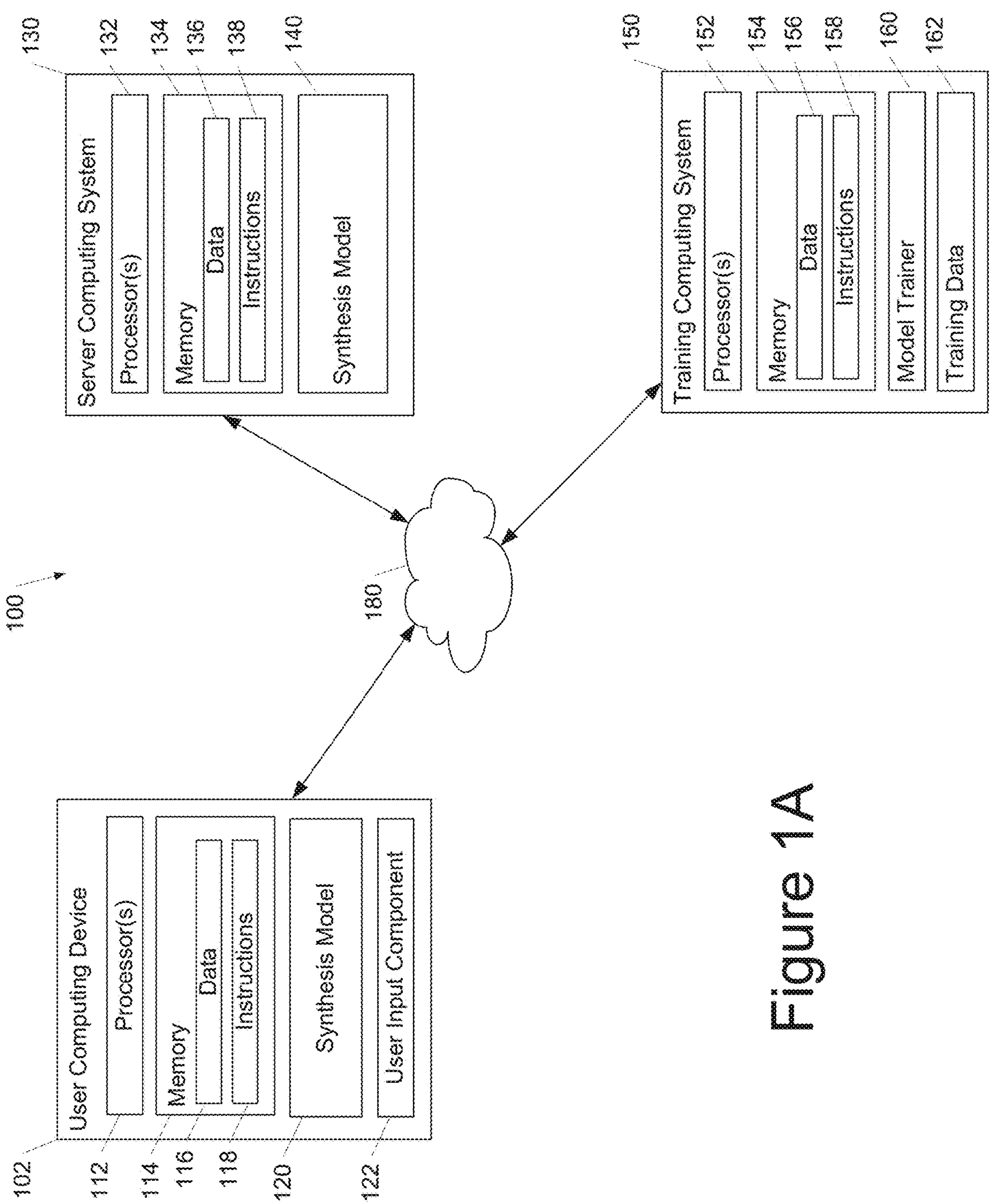
FIG. 1A depicts a block diagram of an example computing system according to example embodiments of the present disclosure.

Generally, the present disclosure is directed to systems and methods for synthesizing computer-readable code based on the receipt of input and output examples. For example, the input and output examples can be provided in the form of one or more input tensors that each contain one or more input values and one or more output tensors that each contain one or more desired output values. As an example implementation, upon receiving a given input and output, a computing system may perform a search of a library of operations (e.g., transpose, slice, norm, etc.) that can be applied to the input. By applying the operations to the input and tracking the results, the computing system may identify an expression comprising one or a combination of one or more operations that, when applied to the input, generates the output. In this manner, implementations of the disclosure may be used to identify one or more solutions that a user having access to the library of operations may use to generate the output from the input.

Thus, the present disclosure provides an interface for users to specify their desired tensor manipulation tasks using an input-output example and, optionally, a natural language description. Given a set of input-output examples, the proposed computing systems can search a library of performable operations to identify a computer-executable expression that transforms the input tensor(s) to the output tensor(s). Specifically, one example approach includes performing a weighted enumerative bottom-up search with equivalence based pruning and/or type-based filtering of expressions. In some implementations, the computing system can use the natural language descriptions to choose which operations to prioritize for search. For example, the computing system can assign respective weights to the operations based on the natural language description and can determine a search ordering or priority based on the weights. Other techniques can additionally or alternatively be used to assign the weights such as machine learning techniques including assignment of weights by a machine-learned model that has been trained using supervised learning techniques and/or reinforcement learning techniques. Alternatively or additionally, end-to-end learning approaches can be used. Various specific algorithms and weighting approaches are described in further detail elsewhere herein.

As an example for illustration, a programmer working with the TensorFlow library may be uncertain how to produce a certain output tensor given an input tensor having a certain shape and values. Thus while the input tensor and output tensor are known, the programmer may not have enough experience using the TensorFlow library or the math background to understand how to manipulate the input tensor to produce the desired output tensor. However, by providing the input tensor and the output tensor to an example computing system according to this disclosure, the computing system may access data descriptive of operations included in the Tensor Flow library that can be applied to the input tensor. The computing system can then build an expression from one or a combination of the operations. In general, one objective is to identify expressions that generate the output for a given input.

In some implementations, the search for expressions can be an enumerative such that each of the operations included in the programming library can be applied to the input (e.g., until a solution is found) to create a search space that can have, in some instances, N-dimensions (N being the number of operations). Alternatively, in certain implementations the computing system can limit or otherwise direct the search for expressions and/or operations. For example, a computing system according to the disclosure may be configured to exclude a certain operation (e.g., a logarithm calculation) from search (e.g., on the basis of a user input that identifies such operation). As another example, a computing system according to the disclosure may be configured to require a certain operation for search (e.g., on the basis of a user input that identifies such operation). As a further example, a computing system according to the disclosure may be configured to identify a certain number of solutions and then limit the search for additional solutions. Thus, for some implementations of the disclosure, the computing system may be configured to receive one or more additional inputs to refine and/or limit the search for expressions, operations, or both.

In some implementations, the system may impose limits on the size of values encountered during the search. In some implementations, the system may limit the size and quantity of search items to limit or eliminate errors involving memory or computing power. In some implementations, the system may automatically apply various operations on arguments if certain criteria can be met.

As an example, the additional inputs can include programming input such as a scalar constant, a computing operation, a description of an operation (e.g., a natural language description such as a term included in the performable operation, a description included in documentation associated with the performable operation, etc.), or combinations thereof. In some implementations, defaults may be established for the search so that an example computing system need not receive an additional user input to refine the search. For example, in some implementations the computing system may be configured to limit the search to only identify a first expression that can be applied to the input to generate the output. Alternatively or additionally, an example computing system may be configured to include a default time limit for the search to limit resource usage and/or computing costs.

Certain implementations according to the disclosure can further include obtaining a second user input (e.g., a data type, a value, etc.) The second user input can be utilized when performing the search to improve or otherwise assist in identifying the one or more computer executable expressions. For example, the search can include: determining an intermediate value by applying the input to at least one of the performable operations, comparing an attribute of the intermediate value to the second user input; and limiting the search to a subset of the one or more performable operations based at least in part on comparing the attribute of the intermediate value to the second user input.

As described above, some implementations of the present disclosure can perform a weighted enumerative search in which the search process is guided by or otherwise performed in accordance with a plurality of weights that are respectively assigned to the plurality of performable operations. The plurality of weights can be assigned in a number of different manners. As one example, the weights can be pre-assigned and/or fixed. As another example, the weights can be determined or refined based on input received from the user, such as a natural language description of the desired transformation. For example, the natural language description (which may also be referred to as a "query") can be searched against the docstrings or documentation pages of various operations and each weight can be determined as a function, at least in part, of a number of keyword matches between such items. As another example, a large corpus of existing programs that employ the library can be searched to match the query against the contents of these programs (e.g., including their notes) and each weight can be determined as a function, at least in part, of a number of keyword matches between the query and the program the number of instances the operation is used in the program. Additionally or alternatively, a deep-learning model that has been trained to output weights given a query can be used in some implementations. This deep-learning model may be used to predict which operations are more likely to be useful in generating a computer executable expression to transform the input to the output. In certain implementations, the deep learning model can be trained on a corpus of existing programs.

In some implementations, performing the weighted search can include a basis for determining the expression. As an example implementation, the weighted search can include searching on an operation by operation basis. For instance, expressions can be built iteratively by identifying successive operation(s) to include in the expression based on the weights assigned to the operations. As another example implementation, the weighted search can include searching on an expression by expression bases. For instance, in some implementations the expression or a predicted expression including multiple operations may be assigned a weighting. For some of these implementations, the weighting of the expression can equal the sum (or another aggregate value) determined from the weights for each operation included in the expression. Thus as the search is performed, an intermediate space can be used to track the results of the operations or combinations of the operations on the input and/or the weights associated with each operation. This intermediate space may be used in some implementations to direct search by utilizing the information to determine weightings for operations.

As an example for illustration, the search can include first determining the result of applying each of operations 1 thru N to the input. Weights can then be assigned to the operations without knowledge of weights of the prior operations. Successive rounds of results can be determined in the same manner to produce an intermediate expression space that may include a solution for transforming the input to the output. Alternatively, weights can be assigned to the operations on the basis of weights assigned to prior operations and/or weights assigned to prior combinations of operations. In this manner, previously identified results may be used to direct the search by exploiting known information. In some implementations a combination of exploring operations and exploiting known results of operations or combinations of operations can be used to perform an adaptive search. In general, this explore/exploit search strategy can be dynamically adjusted during the search or may be defined beforehand. Thus, various strategies can be used to perform the weighted search.

In some implementations, the system may have a domain of programs denoted as D. The domain of programs can be single-line TensorFlow expressions or another form of expressions. For example, in some implementations, the expressions may include the following base values: Python int, float, Boolean, and string literals; TensorFlow data types (e.g., "tf.float32," "tf.int64," etc.); or variables, such as "in1," "in2," etc., to reference the input tensors. Moreover, the expressions may use various operations on the base values including: supported TensorFlow function calls (e.g., "tf.add(x, y)" and "tf.math.segment_max(data, segment ids)"); creating a tuple from supported Python literals (e.g., (0, 1), or from other such tuples; and various forms of indexing and slicing of sequences and tensors, e.g., tensor [−1], tensor[:, 0], tensor[1:], and tensor[:, 0:5].

In some implementations, the search may involve two-stage operation filtering. The first of the two stages can be an individual argument filtering stage. In some implementations, each argument of an operation may first be evaluated for fit. The argument filter may take a value and return a Boolean term indicating whether the value may be an acceptable value for the argument. In some implementations, the second stage of the two stages may be a combination filtering stage. A combination filter may evaluate multiple arguments of an operation as a whole to determine whether the constraints match the given input and output values. A combination filter may determine whether different arguments of an operation can work cohesively or if the values would not work. The combination filter may eliminate executing expensive operations that could easily be caught by a quick check. In some implementations, the individual argument filtering may be run repetitively.

One example of the system may be the searching of a linear function that best fits a set of input and output data. For example, the first argument filter may require the input be a numeric tensor. The first argument filter may eliminate operations that would not be able to intake the numeric tensor. The second argument filter may isolate a potential axis and require an integer. The second argument filter may eliminate values and operations that cannot be a potential axis. Next, the potential axis and the input may be compiled and evaluated by a combination filter. In this example, the combination filter may remove any set in which the axis is not in the range of the input. Lastly, the argument operation may be ran on the remaining combinations to determine the best combination. For existing operations, weighted values of each operation may be assigned and ranked, and the operation with the lowest weighted value may be displayed, which may be the simplest operation or the operation with the least amount of computing complexity.

In some implementations, the two-stage operation filtering may be configured to easily add and reuse filters. In some implementations, the repetitive first stage filters may be cached.

Additionally or alternatively, some implementations according to the disclosure can further include obtaining a third user input that describes certain operations of the performable operations. The third user input can be used to limit the search to computer executable expressions, which include the performable operation of the third user input or to limit the search to computer executable expressions that exclude the performable operation of the third user input. Several non-limiting examples of the third user input include: the performable operation, a term included in the performable operation, a description included in documentation associated with the performable operation, or combinations thereof.

In certain implementations, the systems and methods according to the disclosure can include a machine learning model that may improve synthesizing the computer-executable code by learning or having been trained to assign weights to the operations based at least in part on previously identified expressions that can be applied to the input to generate the output. For example, the weights (e.g., as assigned or produced by the machine-learned model) can be used to guide the order of searching within the context of a weighted enumerative search (e.g., as described elsewhere herein).

Thus, one example aspect of the disclosure includes obtaining one or more inputs (e.g., tensors) that can each be composed of multiple values (e.g., numbers, letters, words, etc.) and one or more outputs (e.g., tensors) that also can be composed of multiple values (e.g., numbers, letters, words, etc.) In general, obtaining the inputs and/or the outputs can be accomplished by receiving transmitted data (e.g., using a communications network), by receiving user input (e.g., using an interface), and/or by accessing stored data on a local device. In some implementations, each of the inputs can be associated with a respective output. Alternatively, the input and output can be obtained as independent example such that there is no specified association between each input example and the one or more output examples. In cases where no specified association is provided between input and output examples, implementations of the disclosure may perform the search for computer executable expressions for each pair of input and output examples. For example, if N input examples are obtained and M output examples are obtained, then a search for computer executable expressions can be performed at least N×M times for each input and output pair.

Another example aspect of the disclosure includes accessing data that describes a plurality of performable operations included in one or more software libraries. The one or more software libraries can be comprehensive, such as including every function in a certain programming language or may be limited to only a subset of the functions included in the language. Additionally, the one or more libraries may be limited to one programming language (e.g., Python) or may include functions from several languages or several versions of the same language. In some implementations, the library can include a scientific compute library such as, for example, a machine-learning library. Several non-limiting examples of machine learning libraries that can be used with implementations of the disclosure include: TensorFlow, PyTorch, and NumPy. As an example for illustration, the performable operations can include functions such as slice to select a portion of the input (e.g., a row from a tensor), logarithm to transform the numeric values in the input, mean, or other functions included in the one or more libraries.

Another example aspect of the present disclosure includes performing a search to identify one or more computer-executable expressions that each include a respective combination of one or more of the performable operations that when performed on the one or more input(s) produce the one or more output(s).

In methods and systems according to the disclosure, performing the search can include conducting a weighted enumerative search in which weights are respectively assigned to the performable operations. In general, the weights should include at least two different weights, the values of said weights determining an order of searching among the set of performable operations. For instance, in some implementations it may be desired to limit the computing cost of the computer executable expression. To indicate this, the weights may be determined based at least in part on the run-time of the performable operation. In some implementations, the weights can also be adjusted during the search. Thus for certain embodiments, the weights can be learned through the identification of computer executable expressions and adjusted based on the identification of a first computer executable expression. The weights can be fixed over multiple searches or dynamically adjusted (e.g., for each search individually).

In some implementations, the enumerative search may enumerate expressions in order of increasing weight. The weight may represent the expression's complexity. In some implementations, operations and initial values may be assigned weight individually and may be later added together to form an overall expression weight. For example, in some implementations, initial values "in1" and 0 may both have a weight of 8, while the operation "tf.expand_dims(input, axis)" may have a weight of 18. In some implementations, the expression "tf.expand_dims(in1, axis=0)" may be 34, because 8+8+18=34.

In some implementations, the numerical value of the weights may be based on complexity. For example, in some implementations, "tf.reverse(tensor, axis)" may have a higher numerical weight than "tf.expand_dims(input, axis)," because the former operation may have more computing complexity. In some implementations, complexity may depend on any of the following: frequency of use, utility of the operation, complexity of operation semantics, and how many arguments are included in the operation. In some implementations, the weights may be used to prioritize simple and useful operations. Additionally, in some implementations, the weights may need to be positive integers for proper enablement of the enumeration.

In some implementations, the system or method may begin with the collection of initial values and may include collecting input tensors and constants (e.g., 0, 1, −1, True, False, "tf.int32," "tf.int64," "tf.float32," and "tf.bool"). The next step may be to include natural numbers up to a maximum for an input tensor to serve as axis values. Dimension lengths of input and output tensors may also be included along with output tensor's shape as a tuple.

In some implementations, the initial values may be assigned weights. In some implementations, the weights may be partially based on the origin of the initial value (e.g., a user-provided value may have a smaller weight than an extracted value). In some implementations, the search may then be performed, where the proceeding results may be provided in order of increasing weight. In some implementations, a desired weight may be determined, and the search may be geared towards that weight. For example, in some implementations, the current expressions being generated may be of weight 76 using a 2-argument operation of weight 36, then the remaining weight may be 40 to partition among the two arguments. For example, in some implementations, argument 1 may have a weight of 32, and the weight of argument 2 may be 8. Thus, in some implementations, previously explored values of weight 32 may be found for argument 1, and existing values of weight 8 may be found for argument 2. In some implementations, a Cartesian product of the two value sets may be created and evaluated. In some implementations, each set of arguments may be inserted into the operation to create an expression of the desired weight. In some implementations, the operations and arguments may be compiled to provide for ease in recursively reconstructing the code representation if needed. In some implementations, once the combinations of arguments and operations are evaluated, the system may output a value's code representation as a solution if the expression produces the correct output tensor.

Additionally or alternatively, the weights can be assigned based in part on a respective computational complexity associated with each performable operation such that performable operations with relatively less computational complexity are searched prior to performable operations with relatively greater computational complexity. In this manner, certain embodiments may be used to more quickly determine computer-executable expressions that can reduce runtime and thus reduce the computing costs of transforming the input to the output. Thus, certain implementations may be used in the optimization of code for transforming an input to an output.

Additionally or alternatively, the weights can be assigned based at least in part on a respective usage frequency associated with each performable operation such that performable operations with relatively greater historical usage are searched prior to performable operations with relatively lesser historical usage.

In general, the weights can be assigned or learned based on data for the same inputs, data for the same input types, or data from overall frequency of usage for the performable operation. For example, operational filtering can be used in some implementations in which certain of the performable operations are excluded from the search due to violation of one or more input or output structures (e.g., input types, data type included in the input, etc.) associated with the performable operations. For example, an operation can be excluded if its acceptable input types do not match the input type being searched, etc.

Additionally or alternatively, the weights can be assigned through performance of an optimization process with respect to performance on a set of benchmarks. In some implementations, the performance can be optimized using a machine-learning model (e.g., a neural network) that can recognize how attributes of and/or context associated with the input and/or the output can be related to certain performance operations.

As an example, some implementations according to the disclosure can include obtaining a set of context data, providing the context data to a machine-learned model, and assigning the weights to the performable operations based at least in part on an output of the machine-learned model produced through processing of the context data by the machine-learned model. In certain implementations the machine-learned model may have been trained based on training data that includes example sets of context data labeled with example performable operations or example weights that correspond to the example sets of context data.

Thus, example implementations can include and/or employ a machine-learned model (e.g., artificial neural network) that has been trained using a supervised learning approach. Multiple machine learning approaches can be used, including, as examples: learning different weights for each "size" of the "value search by size" algorithm; learning a function that, given already-enumerated values, predicts weights for the future enumeration; learning a distribution of operations conditioned on already-used operations; and static approaches for learning dynamic weights (e.g., to avoid the penalty of calling the network at each search iteration). For example, one example static approach may be as follows: $w_i$ f($c_1$, . . . $c_{i-1}$, w). In this approach, weights in layer i are a function of choices $c_j$ made in previous steps j and initial weight w predicted by the model.

Alternatively or additionally, a reinforcement learning agent can be used or employed to generate the weights for the operations. For example, a computing system or method according to the disclosure may be configured to include instructions for obtaining a set of context data, providing the set of context data to a reinforcement learning agent, and assigning weights to the performable operations based at least in part on an output of the reinforcement learning agent produced through processing of a textual description (e.g., or an operation) by the reinforcement learning agent. In some implementations, the reinforcement learning agent can include a policy that has been learned based on iterative evaluation of a reward function that provides a reward to the reinforcement learning agent based on one or more of: a number of expressions explored during performance of a respective training enumerative search (e.g., before finding a solution), a search time associated with performance of the respective training enumerative search, or a latency of a respective output expression identified by the respective training enumerative search. For example, the agent can receive a greater reward by identifying a solution more quickly and/or identifying a solution that has a low latency when executed. Alternatively or additionally, partial rewards can be provided for type-correct completions. As another example, a reward function may consider modeling intermediate runtime states of partial programs.

In some implementations, in addition or alternatively to predicting the weights themselves, the agent can learn its own search strategy where the weights are implicit in its policy. The benefits of using a reinforcement learning approach include the ability to perform learning without "ground truth" in the dataset. Furthermore, the reward can be obtained from multiple valid solutions. In addition, the reward can be more tightly correlated with performance (e.g., whereas certain supervised learning models' loss functions are simply an estimate of performance).

In some implementations, various loss functions may be used in the system. For example, a standard sigmoid cross entropy loss averaged over the operations may be utilized. To address any possible issue of small operation sample rate causing overwhelmingly negative datasets, a differentiable metric as a loss function may be used to achieve different balances in precision and recall. For example, a first differentiable metric may prioritize precision and recall equally, and a second differentiable metric may prioritize recall twice as much as precision.

As another example implementation, the weights can be determined or assigned based on a textual description provided by the user. For example, the computing system can compare keywords included in the textual description (e.g., average) to a respective set of keywords associated with each performable operation. Several non-limiting examples of the respective set of keywords associated with each performable operation can be derived from one or more of: a docstring associated with the performable operation, a document page associated with the performable operation, or a set of existing code that includes the performable operation. For example, a smaller weight (e.g., which may correspond to a higher priority for searching) can be applied to operations that have a larger number of matched keywords between the textual description and the docstring associated with the performable operation, the document page associated with the performable operation, or a set of existing code that includes the performable operation.

As a further example implementation, assigning the weights to the performable operations based at least in part on the textual description can include: providing the textual description to a machine-learned model; and assigning, the weights to the performable operations based at least in part on an output of the machine-learned model produced through processing of the textual description by the machine-learned model. In this and other implementations according to the disclosure, the machine-learned model can be trained or have been trained based on training data that includes example textual descriptions labeled with example performable operations or example weights that correspond to the example textual descriptions. Such modes can be referred to as natural language models as they have been trained to receive text input.

As an additional example implementation, assigning the weights to the performable operations can be based at least in part on attributes of the input and output. For example, features of the input and output such as data types may be used to determine weights that increase search prevalence of operations that include a comparison operator when the input contains numbers and the output contains Boolean values. As another example, if overlap between raw values or the same data types are identified in the input and output, then operations that perform shape manipulations (e.g., transpose, slice, etc.) may be assigned weights that increase the search prevalence of these operations. Additional examples of features can include shape and/or rank for inputs such as vectors, matrices, and tensors. In this and other implementations according to the disclosure, a machine learned model (e.g., a deep learning model) may be included to parse features of the input and output to determine weights for operations.

In some implementations the system may use two machine learning models that predict which operations may be used: a neural model conditioned on features of the input and output tensors, and a naïve Bayes bag-of-words model conditioned on the natural language description of the problem. In some implementations the two models can make predictions that may be used to prioritize and deprioritize operations. The prioritization may be controlled by modifying the operations' weights. The operation prioritization may be modified by multiplying the weight by a constant. Multiplying the weight by a constant less than one (e.g., 0.75) may prioritize, while multiplying the weight by a constant greater than one (e.g., 1.25) may deprioritize the operation. In some implementations, the two machine learning models prioritize and deprioritize operations individually. For example, if both the neural model and the naïve Bayes bag-of-words model prioritize an operation by the constant 0.75, then the operation's weight may be multiplied by $0.75^2$. In some implementations, the weight may be required to be positive, and weights may be rounded to the nearest integer.

In some implementations, the system may utilize different natural language models individually or in combination. For example, in some implementations, the system may use a TF-IDF model, a naïve Bayes model, or an SVM model. In some implementations, the models may accept natural language context from the function or operations. Furthermore, in some implementations, the model may accept function docstrings, function comments, string literals, variable names. The models may accept natural language text from library documentation. The models may use a variety of libraries including TensorFlow, PyTorch, and NumPy. The natural language models may accept natural language text, denoted as D, and operations, denoted as $op_1, \ldots, op_k$, as input. The models may prioritize or deprioritize operations due to a variety of factors. For example, in some implementations, an operation may be prioritized by multiplying the operation's weight by a positive fraction less than one. In some implementations, the modified weight may prioritize or deprioritize the operation in the weighted enumerative search. The number of operations prioritized may be limited (e.g., at most three operations).

In some implementations, the system can use a TF-IDF model. The system may train the model using library documentation (e.g., Tensorflow documentation). In some implementations, a vocabulary may be created. In some implementations, the vocabulary may be derived from words appearing at least once in the docstrings of the library. The vocabulary may exclude stop words. In some implementations, the vocabulary may be derived from other portions of the library (e.g., comments). Each operation $op_i$ may have a vector $V_{opi}$ constructed including the tf-idf score of each term of the operation found in the vocabulary. For example, in some implementations, the tf-idf score may be determined by the number of occurrences in the docstring divided by the smoothed log total number of occurrences of the term across all docstrings. In some implementations, the smoothing may be equivalent to there being a single extra docstring containing every term exactly once.

Furthermore, in some implementations, the tf-idf score may be derived from the term's occurrences related to the summation of occurrences for all terms. For example, in some implementations, an analogous vector $V_D$ may be constructed from the input text D. For example, in some implementations, the TF-IDF model may calculate a score by the cosine similarity between $V_D$ and $V_{opi}$. In some implementations, the operations with the highest scores may be prioritized. In some implementations, a threshold minScore may need to be obtained to be prioritized.

In some implementations, naïve Bayes bag-of-words models may be utilized in the system. The models may be trained on a full constructed dataset. In some implementations, the bag-of-words models can use the same vocabulary, definitions, and document frequencies as other implemented models. In some implementations, the vocabulary may be limited to limit tendencies of the models to overfit the domain of the constructed dataset.

For example, in some implementations, for each operation op, we let $Y_{op}$ be a binary random variable indicating whether op is used in the target program. The naïve Bayes model may estimate the probability of an operation, op, being used given natural language, D, as $$P(Y_{op}ID)\ P(Y_{op})\underset{i}{n}\ P(D_i \mid Y_{op}),$$

where the product may be over all terms i in the vocabulary, and D, indicates the presence of term i in text D. In some implementations, adjustments may be made in response to other models used. For example, in some implementations, the probability of the operation being used in the natural language may be calculated by $$P(D_i \mid Y_{op}1)\frac{N_{i,op}+a}{N_{op}+an},$$

where α may be the Lidstone smoothing parameter. In some implementations, $N_{op}$ may be derived from other models (e.g., a summation of the tf-idf scores of all terms in an operation). $N_{i,op}$ may be derived from other models with reference to a particular term (e.g., a summation of the tf-idf scores of all instances in an operation with term i). In some implementations, n can be the number of terms in the vocabulary.

In some implementations, an estimate for all operations may be used in reaction to the training and test domains greatly differing. For example, all operations may be estimated as $P(Y_{op})$) 0.5. In some implementations, the naïve Bayes model may prioritize operations based on a threshold probability. For example, the model may prioritize operations with a $P(Y_{op}$ ID)>0.75. In some implementations, the number of operations prioritized may be limited (e.g., up to three).

In some implementations, an SVM model may be used individually or in any combination with other models. In some implementations, the SVM model may utilize features from other models (e.g., tf-idf model). For example, in some implementations the SVM model may use a linear classifier (e.g., $S_{D,op}$ $\{3_{op,O}+\Sigma\{3_{op,i}V_{D,i}$, where β may be found by optimizing the hinge loss function with regularization parameter C). In some implementations, an operation may be prioritized based on a certain outcome of the SVM model (e.g., $S_{D,op}>0$, where $V_{D,i}$ denotes the $i^{th}$ element of a tf-idf vector $V_D$).

In some implementations, the TF-IDF, naïve Bayes, and SVM approaches may all be implemented using a machine-learning library (e.g., scikit-learn). For example, in some implementations, different variations of the models may be experimented with by: TF-IDF using minScore {0.1, 0.15, 0.2}, naïve Bayes using a {0.0625, 0.50}, and SVM with parameter C {0.0625, 05.50}.

In some implementations of the disclosure, multiple sets of weights determined using different search strategies may be used to conduct a search in parallel processes. For these implementations, the search strategies may adapt to make use of information discovered from the separate searches. As an example, a first search having assigned weights based on a description of a function to use may identify a first solution (e.g., a computer-executable expression) in a few milliseconds (e.g., about 8 ms). Information about the first solution such as operations included in the expression can be accessed by searches that are occurring in parallel (e.g., to adjust the weights of operations that were included in the expression identified in the first solution). Thus, example search models in accordance with the disclosure may implement multiple strategies in parallel with data sharing and feedback to reduce search time or otherwise improve identification of possible computer-executable expressions. Another aspect of searching in accordance with the current disclosure includes search methods that include value-based pruning. For example, if two different candidate expressions result in the same value, the more complicated (e.g., from the perspective of runtime, processor consumption, and/or the like) can be pruned from a set of candidate expressions that are provided to the user or further evaluated. Alternatively, the two equivalent solutions may be stored and associated with the result of their expression. As an example, assume the expression "tf.add(in1, in2)" is encountered first in the search, followed by "tf.add(in2, in1)" and both expressions produce the same result. For implementations where only one solution is desired, then "tf.add(in2, in1)" can be pruned entirely away. If multiple solutions are desired, each equivalent expression (e.g., expressions producing the same result or transform to the input(s)) can be stored. This may provide advantages in some implementations for tracking different ways of obtaining some result. For instance, using the same example expressions, if the output can be constructed as "tf.transpose(tf.add(in1, in2))", then "tf.transpose(tf.add(in2, in1))" is also a valid solution, since equivalent ways of computing the argument to transpose were stored as associated with the same result.

For implementations where more than one input is received or otherwise obtained by the methods and systems according the disclosure, these implementations may further include identifying a solution space that includes the one or more computer executable expressions identified for one input. The solution space can then be used to generate a prediction by applying the computer executable expressions identified in the solution space to another input (that was not used to identify the solution space). The prediction can then be compared (e.g., for equivalence) with the one or more outputs. In some implementations, the comparison may be used to determine a representation of the distance between the prediction and the output which can then be used to create a loss function for training a machine learning model. In certain implementations, the comparison for one or more predictions can be used to determine a frequency of an operation included in the solution space. For example, a histogram could be created to track the frequency of operations included in computer executable expressions that generate a prediction that substantially equals the output. Generally, substantially equals can mean within about 90% of the true output such as about 90% to about 100%, about 95% to about 99%, or exactly equal (i.e., 100%).

Certain implementations can also include modifying the solution space based at least in part on the comparison. Generally, modifying the solution space can include removing the computer executable expression(s) identified in the solution space if the prediction generated by applying the computer executable expression is not substantially equal to at least one output. In some implementations, the solution space may then be included in an output that can be provided (e.g., for display) to a user.

For some implementations, methods and systems of the disclosure may further include a display such as a monitor or smartphone screen. A further aspect of these systems can include providing the one or more computer-executable expressions for display to a user. In this manner, the user may review and determine one solution from the one or more computer-executable expressions. Thus in certain implementations, the computing system can also include a user input component (e.g., a touch screen, mouse, keyboard, etc.) to receive a user input such as selecting the solution from the set of one or more computer-executable expressions. An additional aspect of these systems can include inserting, in response to the user input, the solution (e.g., one of the computer-executable expressions) into an existing set of computer-executable code such as code that the user has been developing using the computing system. For example, the existing set of code can be a stateless program that does not include variables.

In implementations according to the disclosure, certain operations included in methods and systems can be performed in parallel or in sequence. For example, in the case when multiple inputs or multiple outputs are received. The multiple inputs and/or outputs may be treated as parallel processes such that the search for computer-executable expressions is performed separately for each input and each output. While performing the search can be conducted in parallel, this should not be viewed as limiting these implementations from sharing information or data determined during the parallel processing. For example, as computer-executable expressions are identified, the system may aggregate information from the parallel processes to speed up or otherwise improve the search for additional computer-executable expressions in one or more of the parallel search processes.

For implementations of the disclosure, the methods and systems may utilize a development environment for performing the search. In some implementations, the development environment for performing the search can occur within a notebook environment implemented by a web server (e.g., a Jupyter Notebook, s Colab, or other similar environment). Computation (e.g., searching) can be performed by the web server(s). In certain other implementations, the development environment can occur locally such as on a user device and, in some of such implementations, the computation (e.g., searching) can be performed by the user device (e.g., within the user's kernel).

Execution of the development environment within a notebook environment can have a number of benefits. As one example, code (e.g., Python code) can be used to construct the tensors. For example, a desired output tensor can be constructed programmatically using a known solution (e.g., in this case, the user is hoping that the proposed solution will find a simpler solution). As another example, syntax highlighting and formatting can be applied. As yet another example, results can be easily streamed and complete control of text output is provided.

In other implementations, the development environment can be executed using a set of code included in a plug-in to an integrated development environment software application. For example, the development environment can include a library of operations included in a software package that may be imported or otherwise accessed using a management system (e.g., pip install for Python).

In some implementations, obtaining the one or more inputs and the one or more outputs can occur in a web environment. For example, one or more web servers can be used to serve a web site that includes a user interface having defined data entry fields for providing entry (e.g., by user typing) of the inputs and/or outputs. Execution of the proposed processes within a web tool provides additional flexibility. As one example, a tensor editor graphical user interface can be provided that allows for: Easy entry of values with tab/enter (instead of typing commas and brackets manually); Bulk copy/paste of values; Saving tensors for future reference; Easy dimension manipulation (e.g., a few clicks to "expand_dims"); and/or Import from and/or export to a list format, for instance tf.constant([[1, 2], [3, 4]], dtype=tf.int32).

In some implementations, the system can be trained using a synthetic dataset. In some implementations, the enumerative search algorithm may be utilized to generate a synthetic training dataset. For example, in some implementations, the enumerative search algorithm can be used to create a dataset that can train a model to learn a Bernoulli distribution over each operation, conditioned on input and output tensors.

In some implementations, the synthetic generation may begin with running a search on randomly generated inputs to gather a large number of explored values. In some implementations, the explored values may be used to extract possible trends or collapse code trees to be created into new input tensors to create more variety. In some implementations, the new input tensors may be required to match the value of the code tree replaced by the new input tensor. In some implementations, the dataset may then be filtered by a number of operations or other parameters.

In some implementations, the system may compute a set of features for the input/output tensors to feed into the model. In some implementations, the set of features may include the kind of value (e.g., primitive, sequence, tensor, or SparseTensor). In some implementations, the set of features may include the value's data type, rank, and dimension lengths. The set of features can include statistics (e.g., max, min, mean) of the tensors' elements. Moreover, the set of features may include the number and fraction of elements satisfying various properties (e.g., positive, exactly zero, in the range [0, 1], unique elements, etc.). In some implementations, the set of features can include various Boolean properties of the value (e.g., entirely positive, all elements unique, sorted, etc.).

In addition, in some implementations, the system may compute features representing the comparison of each input value to output value. The comparison features may include: comparing the number of elements, ranks, and each dimension length; the number and fraction of input elements that also appear in the output, and vice versa; if all input elements appear in output, and vice versa; and if each dimension length of the input also appears as some dimension length of the output, and vice versa. In some implementations, an input/output example may be featured by padding the list of inputs with dummy input values. In some implementations, the values may be padded until a designated number of values exist such that the same number of features are extracted for each example. The input and output values may then be evaluated to extract features individually and in relation to one another. In some implementations, the number of inputs may also be a feature. Lastly, in some implementations, by concatenating all of the features, the system may obtain a feature vector for the example.

In some implementations, a SparseTensor may be utilized to represent large sparse tensors in a memory-efficient way. A SparseTensor may be a special kind of tensor object that represents large sparse tensors. In some implementations, a SparseTensor may only be used if the input or output tensor is a sparse tensor or if the natural language search include "sparse."

Further example benefits of the web tool environment may include: Interactive exploration of subexpressions (e.g., hover over an operation to see the result of only that subexpression); Saving synthesized results for future reference; Browsing examples provided by other users that are also solved by the synthesized solution, e.g., as a "sanity check" to make sure that the expected behavior is met; Cached results so that a static URL can link to an already-found solution to a problem, which may be useful for collaboration and educational settings. However, users can be provided with controls that allow the users to control whether their results are shared, thereby enhancing user privacy.

The present disclosure provides a number of technical effects and benefits. As one example technical effect and benefit, by automating search, example methods and systems can be used to identify new solutions, to concentrate the solution space based on providing additional input(s) such as operations to exclude, or to more quickly identify solutions when a developer uses a language or library that she is unfamiliar with. This increased efficiency can result in faster production of deployment-ready computer code, which can result in fewer hours of computing time needed to produce the code. Specifically, automated synthesis of expression can result in less time browsing through operations and reading their documentation, fewer debugging cycles when the code is not optimal the first draft, and higher confidence that the code behaves as expected. This reduced usage of computing time can result in conservation of computing resources such as reduced processor usage, reduced memory usage, and/or reduced network bandwidth usage.

Furthermore, the automated search techniques described herein can result in computer code that is generally of higher quality that would be produced by a human developer that is unfamiliar with the appropriate expressions for obtaining the desired input-output transformation. Thus, as one example, the search can include evaluating various potential solutions on the basis of execution time, compute requirements, and/or the like such that, when multiple solutions are possible, the solution that has the lowest execution time, compute requirements, or similar can be selected and included in the computer code, thereby resulting, at each instance of execution of the computer code, in conservation of computing resources such as reduced processor usage, reduced memory usage, and/or reduced network bandwidth usage.

A number of different variations and extensions of the above describes example implementations are possible. As one example, the computing system can find multiple solutions to a task and present them all to the user, so that the user can pick the one that makes the most sense to them. If non-equivalent solutions are found, the user interface can show distinguishing inputs to the user to help them choose. As another example, the computing system can allow the user to provide a known solution that should be optimized, e.g., for code simplicity, memory usage, or efficiency. The computing system can then automatically find alternative (e.g., optimal) approaches and test them on input tensors. In one variant of this approach, the input solution may be provided in a first programming language and/or from a first programming library while the search is performed relative to a second programming language and/or a second programming library. As another example, the computing system can enable or perform iterative refinement of a task. For example, if a user realizes that one example is insufficient, the user can be enabled to add another example, and the computing system can then reuse the existing search progress with the additional example provided. As another example, the search can be extended from expressions to multi-line programs (e.g., TensorFlow programs). As another example, the search may be restricted to differentiable operations. As yet another example, the system may take advantage of concurrency.

With reference now to the Figures, example embodiments of the present disclosure will be discussed in further detail.

Example Devices and Systems

FIG. 1A depicts a block diagram of an example computing system 100 that performs code synthesis according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more synthesis models 120. For example, the synthesis models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example synthesis models 120 are discussed with reference to FIGS. 2-5.

In some implementations, the one or more synthesis models 120 can be received from the server computing system 130 over network 180, stored in the user computing device memory 114, and then used or otherwise implemented by the one or more processors 112. In some implementations, the user computing device 102 can implement multiple parallel instances of a single synthesis model 120 (e.g., to perform parallel code synthesis).

Additionally or alternatively, one or more synthesis models 140 can be included in or otherwise stored and implemented by the server computing system 130 that communicates with the user computing device 102 according to a client-server relationship. For example, the synthesis models 140 can be implemented by the server computing system 140 as a portion of a web service (e.g., a code synthesis service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned synthesis models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2-5.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the synthesis models 120 and/or 140 based on a set of training data 162. As one example, the training data 162 can include data collected from questions posted in chat rooms (e.g., TensorFlow-users) or other help or community collaboration sites. As another example, a computing system can passively collect real tasks from actual users of a prototype TF4TF tool. As another example, existing code can be obtained, and unit tests can be run to find the values of tensors before and after executing a particular expression. As another example, training data 162 can be generated by sampling synthetic programs and running them on randomly-generated input tensors to get corresponding output tensors.

Thus, one example form of training data 162 is synthetic training data. For example, training data 162 can evidence relationships between natural language words and performable operations. To obtain the data 162, function and variable names, docstrings, and comments in library-related functions in a corpus of code, and the library documentation can be examined for its operations.

Another example form of training data 162 is real training data. For example, to obtain real training data, questions posted in chat rooms or other help or community collaboration sites can be condensed into a short description or "query." As another example, descriptions of tasks can be collected from people using the proposed tool. The user's incentive is that providing a description can result in improved performance. In some implementations, the synthetic training data can be used to get a preliminary model, and that preliminary model can be applied to the user descriptions, to deliver on the user's expectation of "improved performance."

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
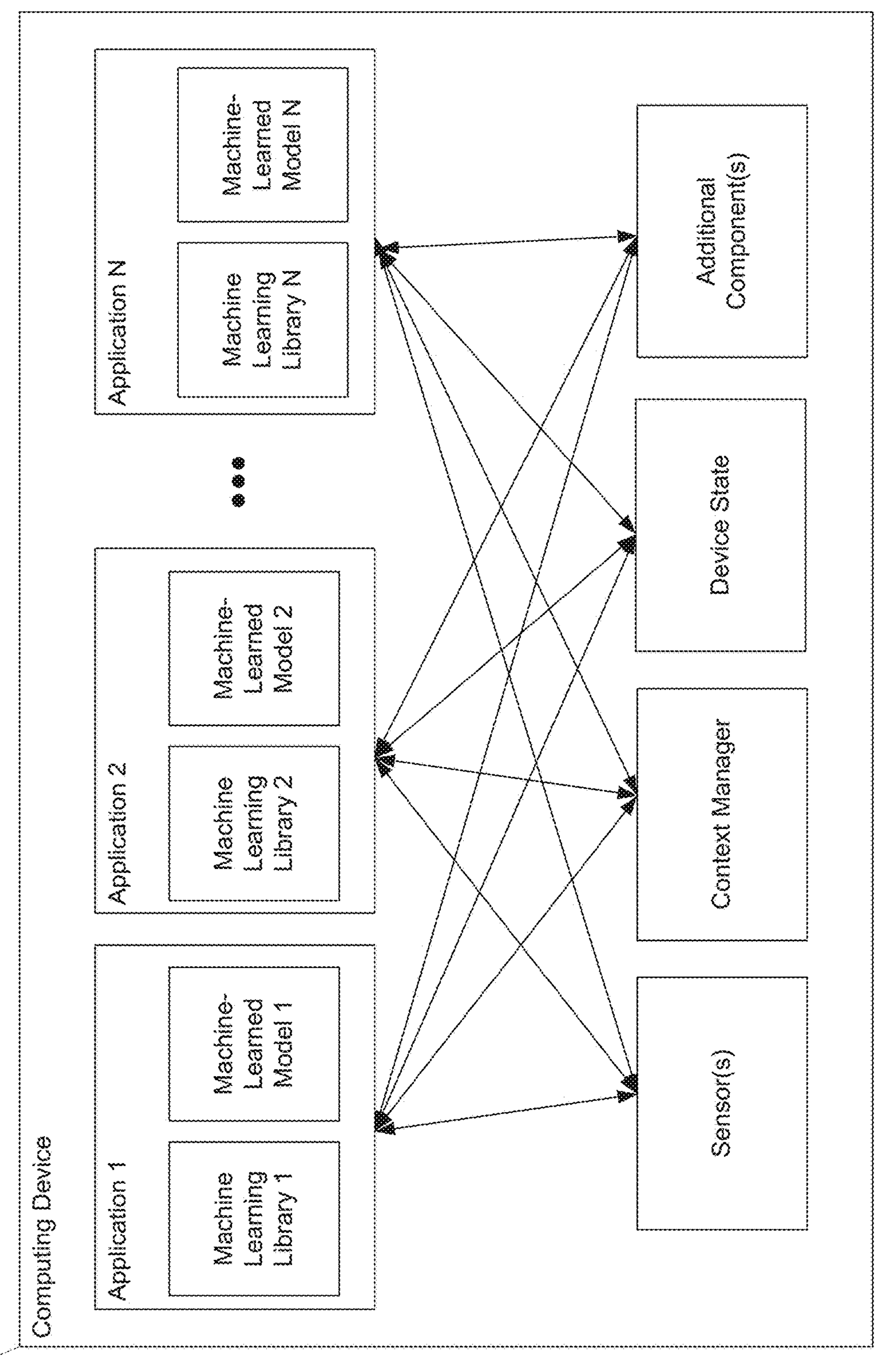
FIG. 1B depicts a block diagram of an example computing device according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
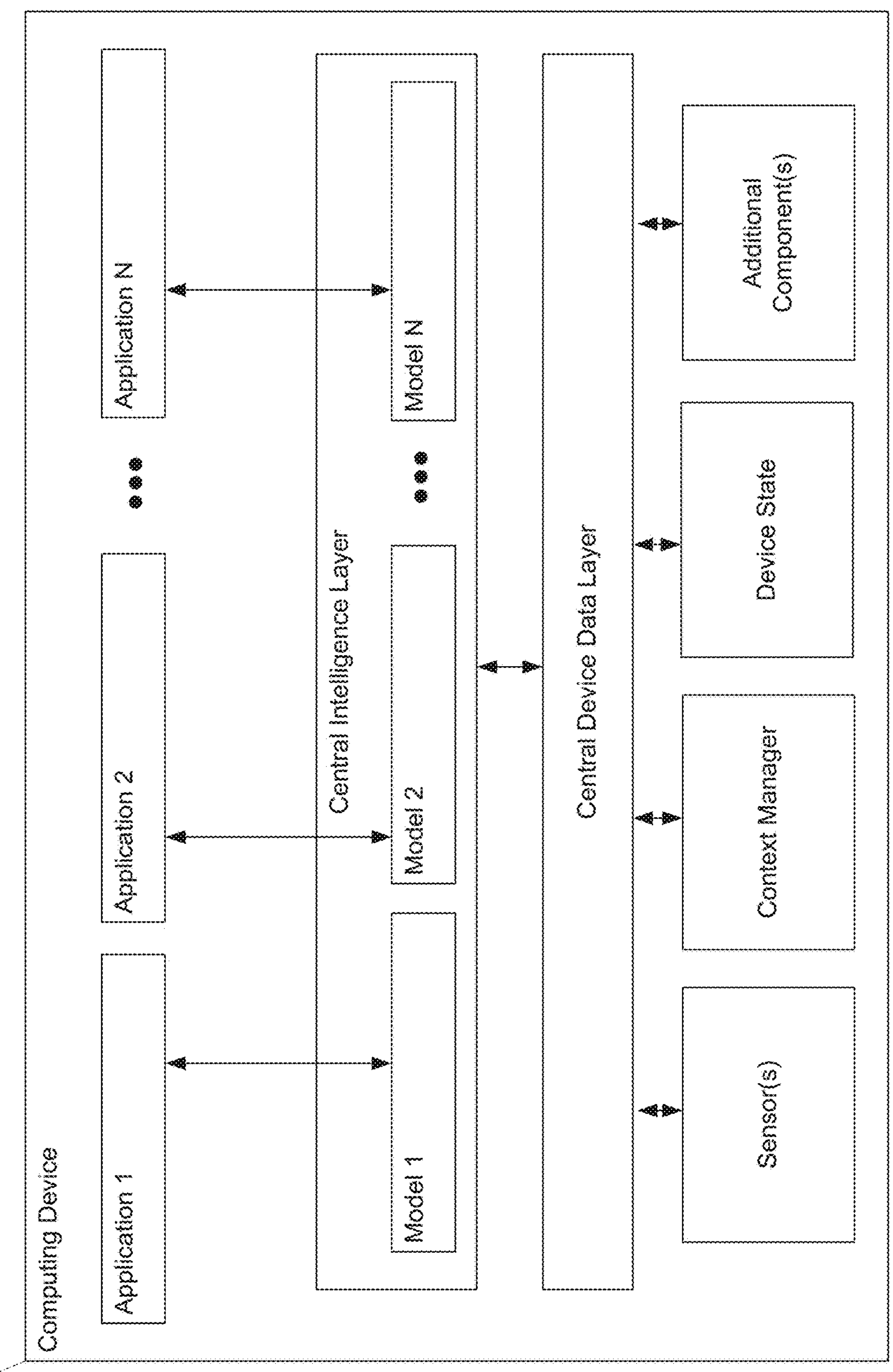
FIG. 1C depicts a block diagram of an example computing device according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Arrangements

Figure 2:
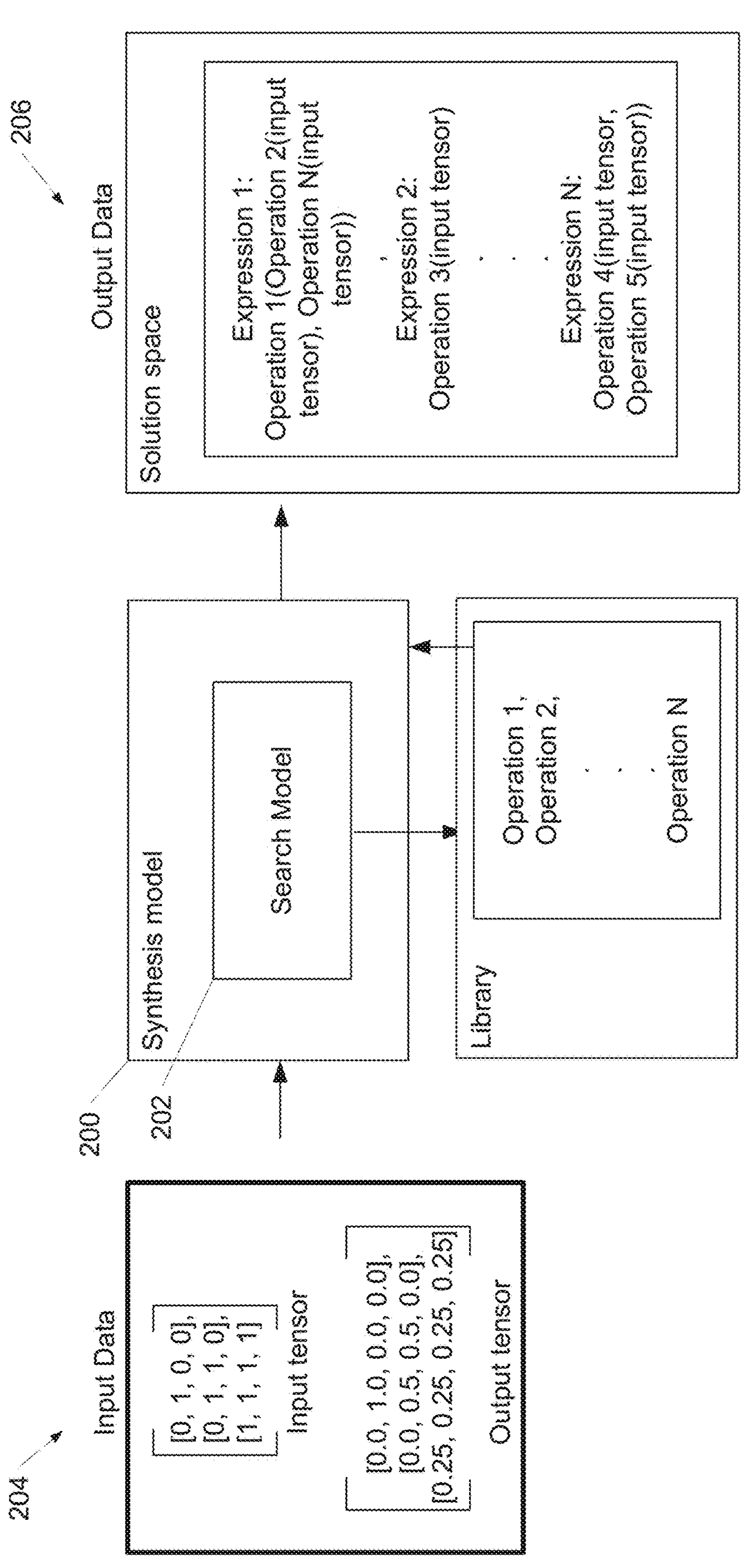
FIG. 2 depicts a block flow diagram of an example process according to example embodiments of the present disclosure.

FIG. 2 depicts an example arrangement for synthesizing computer-executable code from input and output examples. The figure depicts example input data 204 that includes an input tensor and an output tensor. This input data 204 can be provided to the synthesis model 200 which includes a search model 202 configured to identify one or more computer executable expressions which each include operations from a library of performable operations. The synthesis model may access data in the library that can include both the operations (e.g., operations 1, 2, 3 . . . N) as well as descriptions of the operations such as a docstring or comments in the code embodying the operations. In this manner, certain operations or combinations of operations may be identified as a solution space, where each expression can be applied to the input (e.g., input tensor) to generate the output (e.g., output tensor).

The search model 202 can operate according to a number of different approaches. As one example, the search model 202 can perform an enumerative search. For example, let Vo be the set of input tensors and constants. These are values that we already have, requiring zero operations to obtain. Compute $V_{t+1}$ $V_i \cup$ {All Values Obtained by Applying any Operation, where Arguments are Drawn from $V_i$}

For each value, keep track of how that value was obtained (e.g., what operation is applied to which other values). In the case of multiple input examples, the system may keep track of all ways a value can be computed.

Pruning: if a value can be computed in multiple ways, only consider the value once (i.e., $V_i$ is a set, not a list).

Another example approach includes applying expressions scraped from a corpus. In this approach, the system can find all library-related expressions in a corpus of code. The system can partition the expressions based on the number of distinct variables involved. Within each partition, the system can sort the expressions in order of decreasing frequency. If the user-provided examples have n input tensors each, then the computing system can run all expressions that have n distinct variables, for all n! ways of assigning expression variables to input tensors. This can be done with massive parallelization. Constants in the scraped expressions could be modified.

Another example approach is to perform an enumerative search based on expression size. This is an extension of the basic enumerative search described above, which can be viewed as iterating by depth of the expression tree, i.e., $V_i$ contains all values that can be obtained by an expression with depth i. This is inefficient because many desirable expressions are deep but narrow, and in order to enumerate such expressions, the search would have to exhaust all expressions of smaller depth, even if those expressions are excessively large (wide).

However, with some combinatorial tricks, the search can enumerate based on expression size (e.g., number of nodes in the AST). To enumerate values of a certain size S: Iterate over all operations. Assume an operation has A arguments. Partition (S−1) into A pieces, $s_1 \ldots s_A$. Cartesian-product the values of size $s_1 \ldots s_A$ to get lists of argument choices. That is, argument i can be filled with any previously-seen value of size $s_i$.

Mechanisms can also be provided to filter values for specific operations, reducing the number of evaluations that result in errors (e.g., due to type or shape mismatches), which yields significant speedups since some operations are very slow in exceptional cases.

To get further speedups and to introduce a deep learning aspect to the problem, each operation can be allowed to have a different weight (e.g., which may be a "small" integer). In some implementations, the "size" of an expression can equal or be correlated to the sum of the "weights" of its operations. If an operation has small weight, then the enumerative procedure will process it sooner and more frequently. This can allow the search model 202 to prioritize simpler or more common operations over rarer ones.

Furthermore, in some implementations, machine-learned models such as deep neural networks can be used to assign weights depending on (features of) the user-provided tensors and/or a natural language description of the task. Using deep learning to assign operation weights has several benefits. As one example, the system can maintain the high throughput of the weighted enumerative search, since, in some implementations, the machine-learned model makes predictions once at the beginning of the search. Other common ways of using deep learning (e.g., with generative models) cannot come close to tens of thousands of expressions per second.

Learning to map user input (including the natural language description and features of example tensors) to a distribution over likely operations is a more tractable and forgiving task than an end-to-end approach with candidate programs as output. Specifically, a slight error in one part of the predicted program will likely result in a broken program, whereas a slight error in weight for one operation might only result in a small slowdown.

The model can choose to search "deep" by assigning small weights to a few operations and large weights to others, or to search "wide" by assigning relatively equal weights to many operations.

An assignment of weights to operations can define a particular ranking of programs in the search space. The weights can be manipulated (e.g., smoothing or sharpening them) to form different search spaces, and the system can search through those different spaces concurrently.

As another benefit associated with one particular example approach, a reinforcement learning agent that predicts operation weights can collect detailed rewards. In contrast, a reinforcement learning agent that predicts output programs would very rarely get rewarded, and that reward would usually be binary—the task is either solved or not.

Thus, a number of different methods for choosing weights for operations exist. Static assignments of weights can include the following: Initial assignment where every operation has a weight of 1; Inferred from usage frequency (e.g., operations that are used more often in a corpus of code should be assigned smaller weight); Optimized on a set of benchmarks (e.g., a simple hill-climbing search over operation weights can reach a locally optimal setting of weights with respect to performance on a set of benchmarks).

Learned assignments of weights can include the following: A machine-learned model can ingest (features of) the user-provided tensors and the natural language task description, and output weights for operations.

One option for such a machine-learned model is to train a reinforcement learning agent that collects reward by running the enumerative search with the predicted operation weights on a set of benchmark tasks. The reward could be a function of the number of programs explored before finding a solution, the time it takes for the enumerative search to succeed, and/or other measures of performance. The benefits of a reinforcement learning approach include the fact that the agent can collect reward from different solutions if multiple exist, without needing to target any single solution as the "ground truth." Likewise, the dataset of tasks doesn't even need to contain any solutions at all, as long as they can be found through enumerative search with a reasonable setting of operation weights.

Another learning-based approach is to compare predicted operation weights to operations in a "ground truth" known solution. For example, a training system may be able to estimate how fast the enumerative search would be, without actually running it. A loss function may be derived from this estimation, allowing for training without actually running any enumerative search. The benefits of this approach may include faster training iterations.

The above-described approaches are generally described in the context of only a single input-output example for simplicity. Extending these baselines to work on multiple examples can be done in multiple different ways. As one example, the first pair of input/output examples can be treated as the only example to begin with. For each solution found for the first example, such solution can be output as a final solution only if such solution also works on the other examples, otherwise such solution can be discarded. As another example, instead of a "value" being the result of an expression applied to inputs from one example, a "value" can now be treated as a tuple of results, one for each example. Thus, the multiple pairs of input/output examples can be simultaneously searched and solved.

Figure 3:
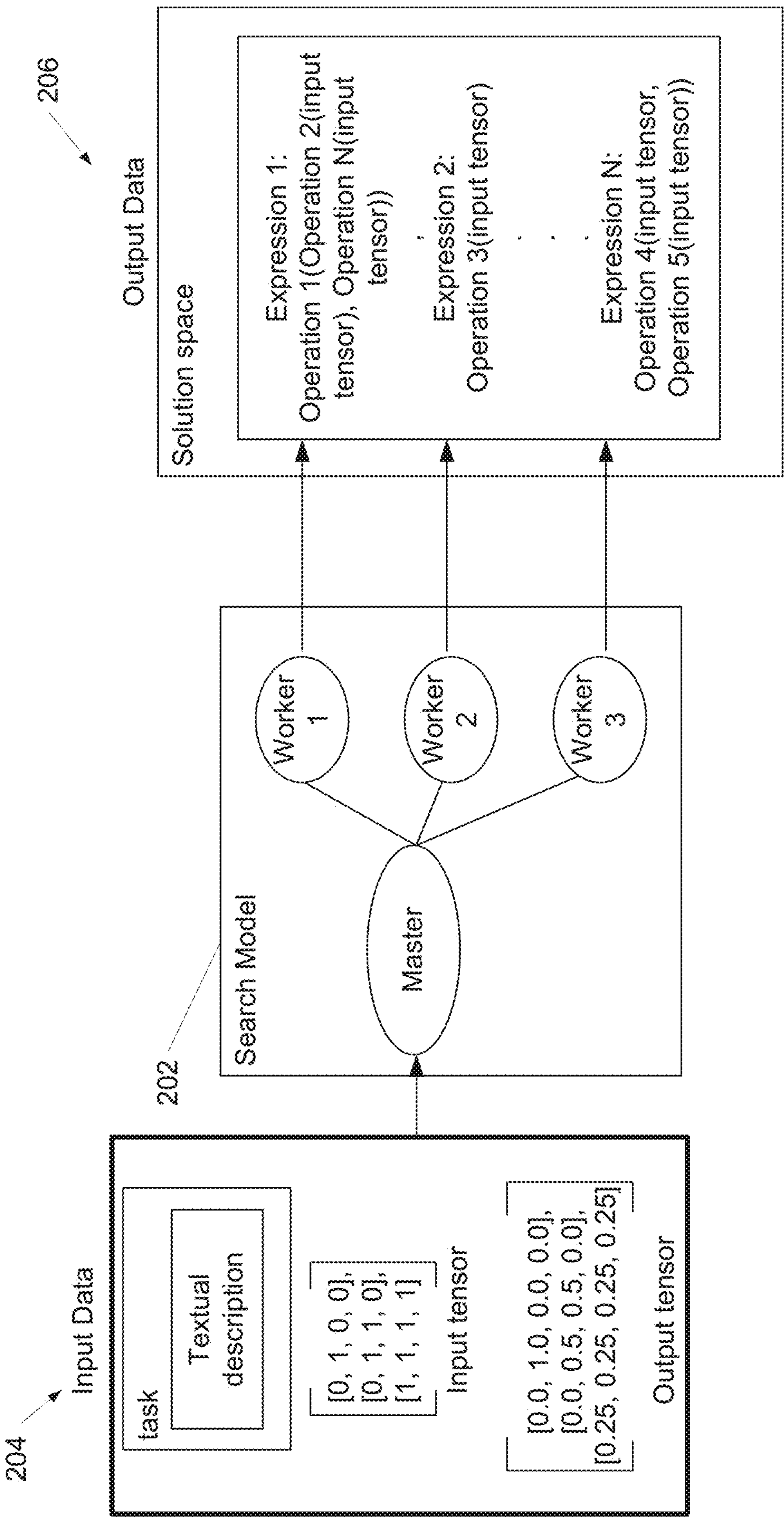
FIG. 3 depicts a block flow diagram of an example process according to example embodiments of the present disclosure.

FIG. 3 depicts another example arrangement for synthesizing computer-executable code from input and output examples. FIG. 3 depicts additional input (e.g., a textual description) included as part of the input data 204. This additional input may be used to specify a task that can direct the search model 202. As one example, the task may be to only identify or consider a certain number of expressions in the solution space. As another example, the task may be to perform specific operation and the textual description may include an operation (e.g., slice) or a description of an operation (e.g., select a row). The input data 204 can be provided to the search model 202 which may, in some implementations, be configured as a distributed process (e.g., map reduce) to perform the search in parallel.

Additionally, in some implementations, a master node may keep track of each of the searches performed by the workers to set different strategies or modify search strategy based on receipt of information such as the weights and/or the identification of a first computer-readable expression. More particularly, assume that multiple processes exist. Each "worker" process can run an enumerative search using a given assignment of weights to operations. The "master" process can accept a synthesis problem from the user and then produce a set of different weight assignments. Each weight assignment can be sent to a separate worker. The master "succeeds" as soon as the first worker finds a solution. Alternatively, the master can receive multiple solutions and evaluate them to select a "best" solution according to some defined metric (e.g., expression latency).

Figure 4:
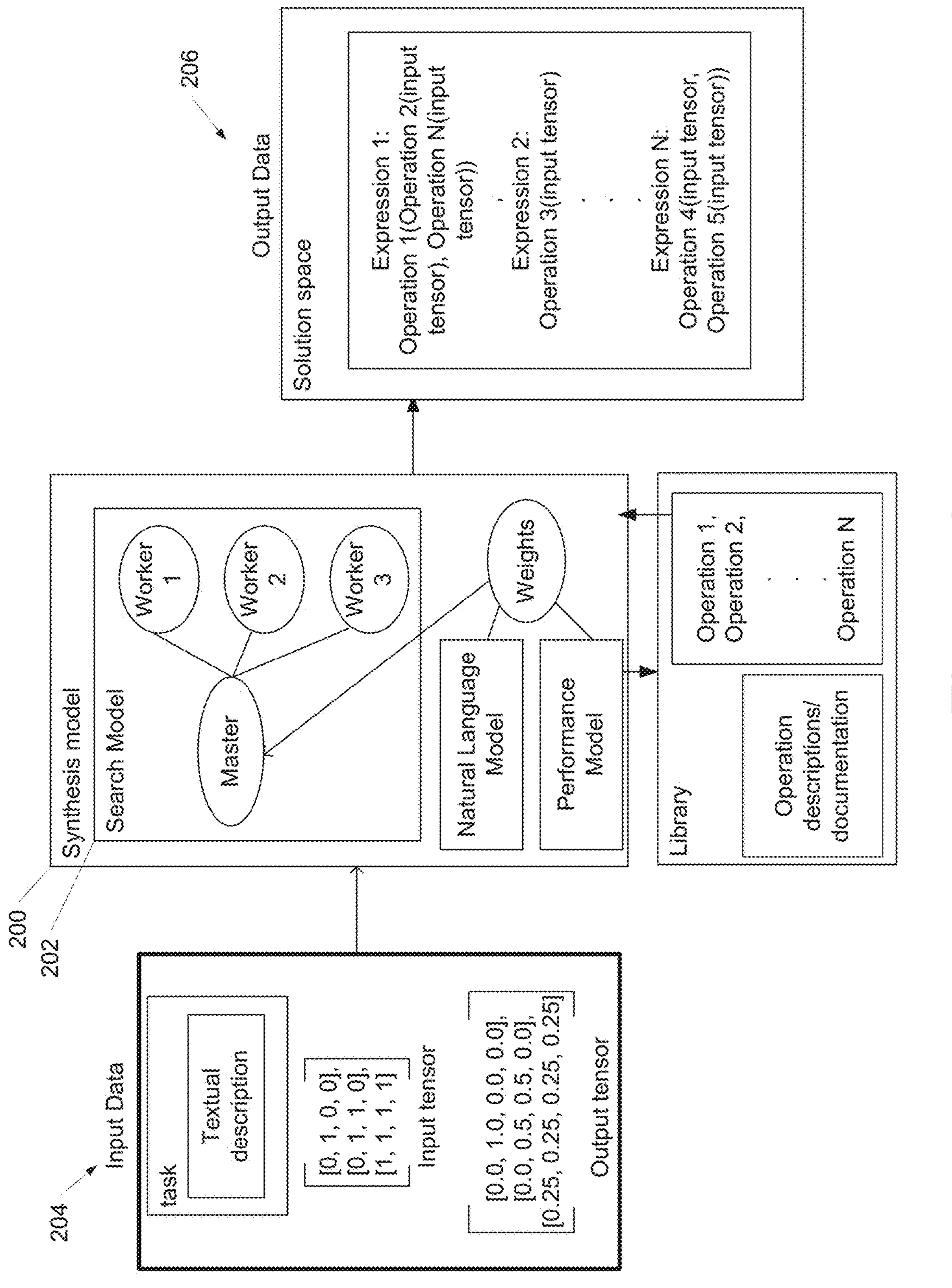
FIG. 4 depicts a block flow diagram of an example process according to example embodiments of the present disclosure.

FIG. 4 depicts another example arrangement for synthesizing computer-executable code from input and output examples. The figure depicts a certain configuration for the synthesis model where weights are calculated to direct the search. As shown in the figure, the weights can be determined with the help of a natural language model.

Generally, the natural language model can be configured to receive a textual description related to information included in a library and correctly output the operation corresponding to the textual description. For example, the textual description may include minimizing expression run time, which can be used to assign weights based on the computational complexity of the operations.

More particularly, to incorporate human intuition into the synthesis algorithm, the system can enable the user to enter a natural language description of the task, which would then influence the operation weights. This has two desirable effects: First, synthesis can become faster if this leads to prioritization of the correct operations. Second, for ambiguous examples, or for tasks that may be implemented in different equivalent ways, the system may be able to generate a solution that more closely matches the user's intent.

Thus, the present disclosure provides solutions to the following problem: Given a natural language description of a tensor manipulation task, assign weights/priorities to the different operations, depending on how relevant to the task they seem to be. A number of different approaches for solving this problem are as follows and, of course, multiple of the below techniques could be used in combination.

One example approach is to use library documentation (e.g., TensorFlow documentation). TensorFlow has documentation for every operation. Some example systems can score an operation based on the similarity between the user's description and the operation's documentation text, for instance using term frequency-inverse document frequency (TF-IDF) or pre-trained word embeddings (or a combination). Use of such documentation can be beneficial because the documentation contains information about argument names and, when applicable, the documentation lists the NumPy equivalent ("Equivalent to np.max"). Furthermore, TF-IDF is simple and easy to understand. Likewise, this setup, where the system scores a known set of documents given a query, is easily formulated as an IR (information retrieval) problem, and the TF-IDF ranking can later be extended to use more advanced IR techniques.

In some implementations, the neural model may first embed categorical features (e.g., properties, bucketed numbers, data types, etc.), using an embedded size equal to the cardinality of the feature. The embeddings can be concatenated along with the unembedded features (e.g., fraction features), and can be passed through feedforward dense layers. In some implementations, a final dense output layer may produce a logit for each operation. An elementwise sigmoid may be applied to get a probability for each operation.

Another example approach is to mine natural language/operation associations from a corpus of code to which the system has permission to access. In particular, given a large corpus of code, the system can identify portions that use TensorFlow or other relevant libraries. The system can extract natural language words from function names, variable names, docstrings, and comments, and mine associations between these words and nearby library operations.

Thus, a dataset of pairs of the form ([natural language words], [nearby TensorFlow operations]) can be created. Here, "nearby" could mean "within the same function" or, in the case of non-docstring code comments, "within a few lines". From this dataset, statistical techniques can be employed to predict performable operations given a natural language query.

This could also be viewed as a learning problem. From the same dataset described above, synthetic "descriptions" of tasks can be constructed by semi-randomly selecting important words, and the model would have to predict the nearby operations.

Advantages of this statistical approach include that the actual usage of library operations is often highly skewed—many library operations are used very rarely. A statistical approach may be able to produce useful associations for these rare operations without much usage data, which might not be feasible using deep learning. However, a learning approach can generalize better if it results in good embeddings for words (e.g., it can handle synonyms automatically).

Another example natural language approach includes the use of a web search engine. For example, the system can use a web search engine to perform a web search with the natural language description. For example, the web search can be restricted to the TensorFlow documentation site. The result would be an ordered list of TensorFlow operations that certain web search results indicate are relevant to the description.

Referring again to FIG. 4, in some implementations, the weights may also be determined using a performance model. The performance model can access information related to the expressions such as their ability to transform a certain input to an output. Thus, the performance model is generally configured to provide feedback based at least in part on expressions that have already been identified. Additional learning models may further be included to improve the search based on techniques available in the field. Further search strategies such as value-based pruning may also be implemented to reduce run time and/or diminish redundancy.

Figure 6:
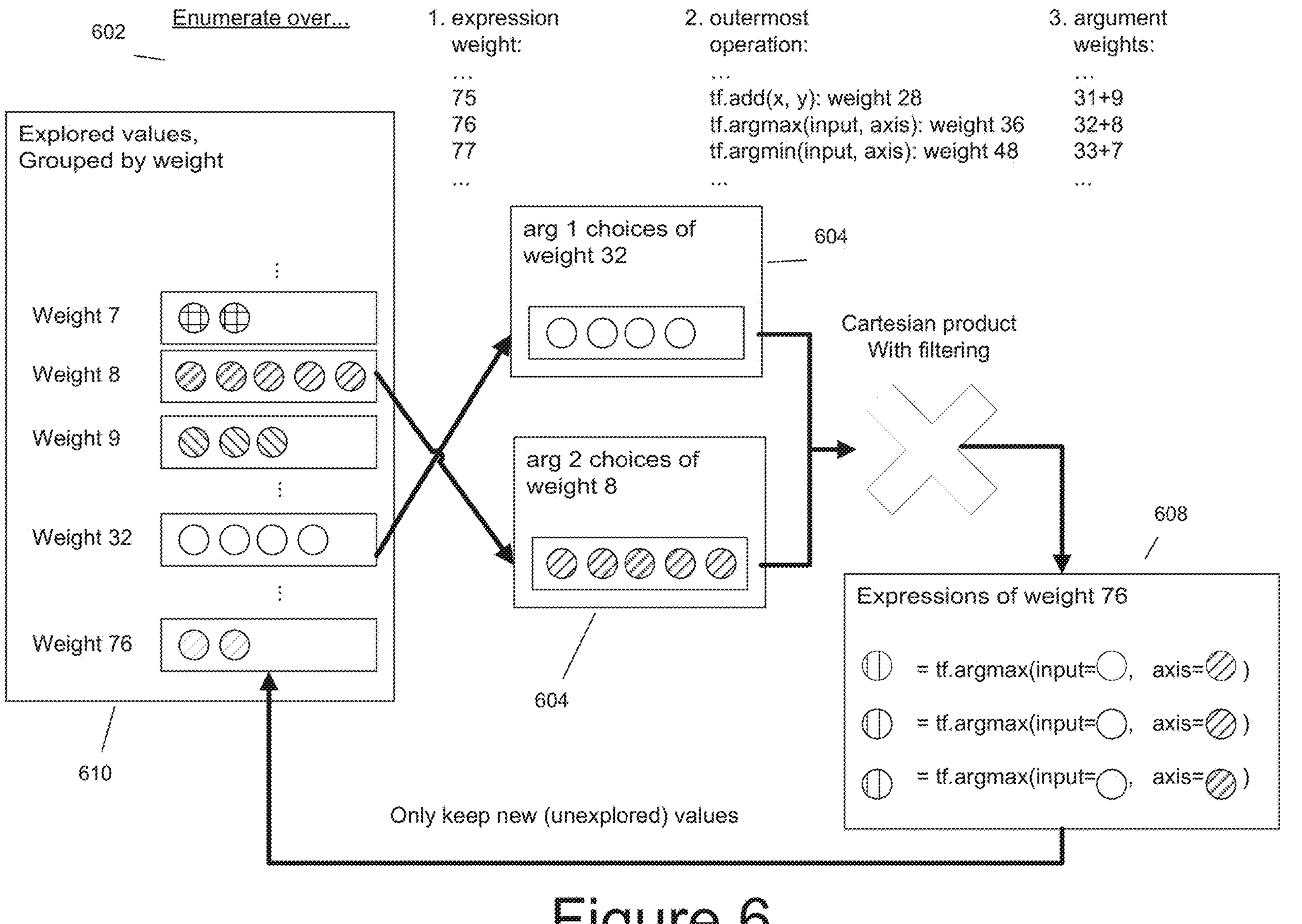
FIG. 6 depicts a block flow diagram of an example process according to example embodiments of the present disclosure.

FIG. 6 depicts an example overview of an enumerative search algorithm. The enumerative search algorithm system 610 may store already-explored values 602 organized by weight, initially just the input tensors and constants (provided by the user and heuristically chosen). The system may enumerate expressions in order of increasing weight. For a target expression weight (e.g., 76), the system may enumerate over operations (to apply to existing values) and weights for the operation's arguments. For example, the operation "tf.argmax(input, axis)" may have a weight of 36 and two arguments. Thus, the remaining weight (76-36=40) can be partitioned into two parts 604 (e.g., 32+8) representing the weights of the two arguments. Options for the arguments may be drawn from previously explored values, and a Cartesian product with customizable filtering may produce lists of arguments. Finally, the chosen operation 608 can be applied to each argument list to produce new values.

Figure 7:
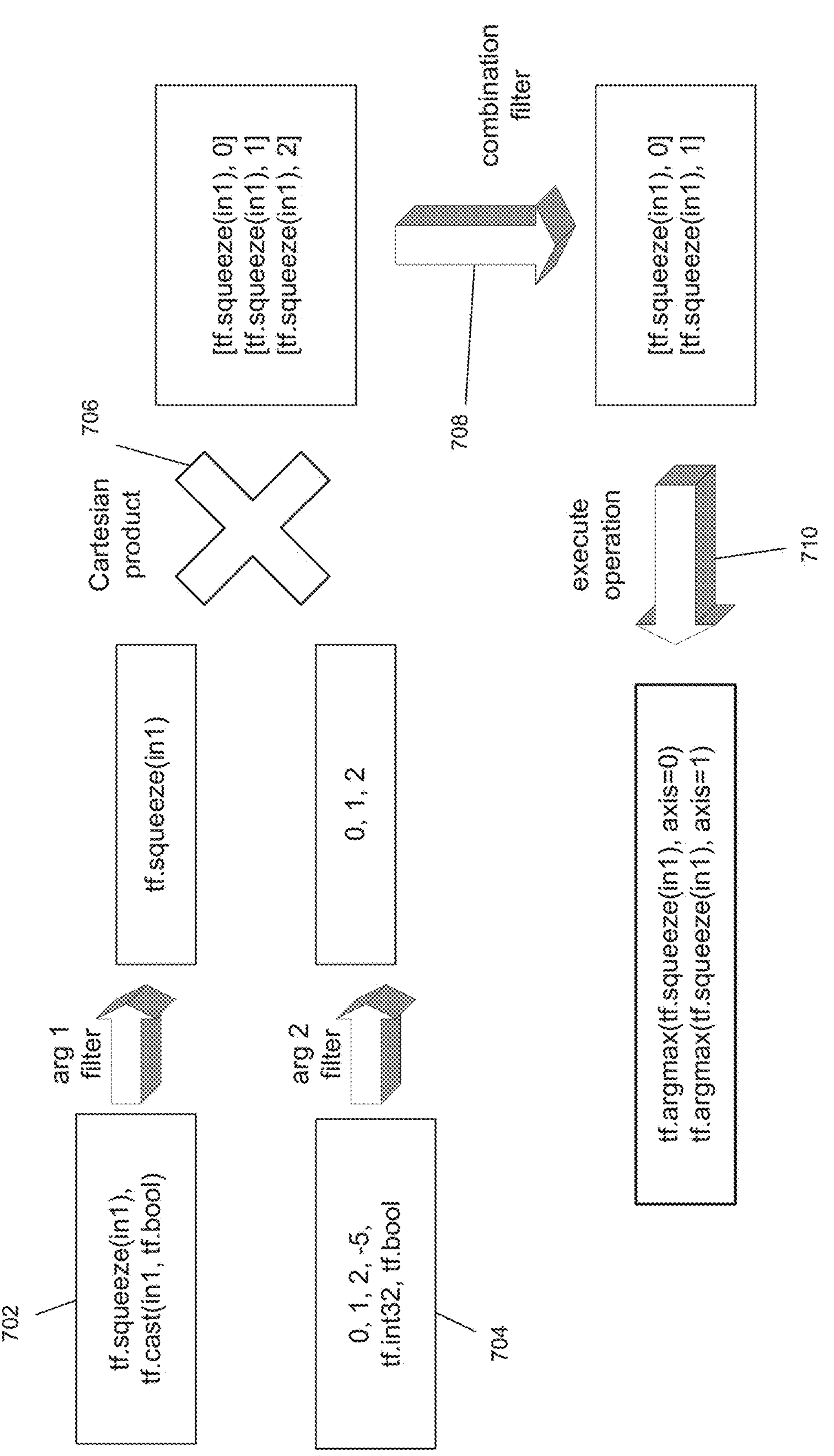
FIG. 7 depicts a block flow diagram of an example process according to example embodiments of the present disclosure.

FIG. 7 depicts an example of two-stage operation filtering. Two-stage operation filtering can be demonstrated by flexible search and operation filtering for the "tf.argmax (input, axis)" operation. For example, the first argument, input 702, may be required to be a numeric tensor (e.g., not a Boolean tensor), therefore, "tf.cast(in1, tf.bool)" can be removed by the "arg 1 filter." The second argument, axis 704, may need to be an integer that is a potential axis value, therefore, −5, "tf.int32," and "tf.bool" may be removed by the "arg 2 filter." A Cartesian product 706 may produce lists of arguments. Finally, the axis may be required to be in range for the particular input, therefore, "[tf.squeeze(in1), 2]" may be removed by the "combination filter" 708 if "tf.squeeze (in1)" actually has rank 2. After these filtering steps, the "tf.argmax" operation 710 can be applied to the surviving combinations of arguments.

Example Methods

Figure 5:
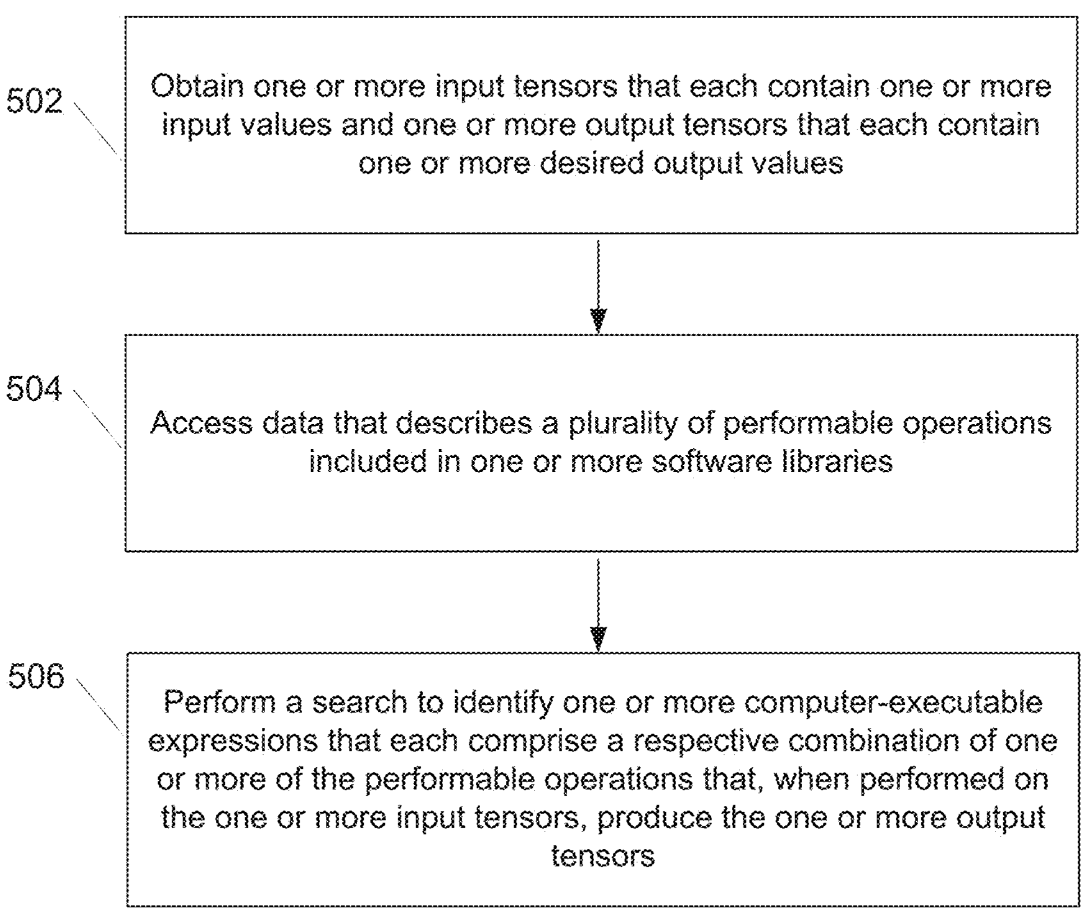
FIG. 5 depicts a flow chart of an example method according to example embodiments of the present disclosure.

FIG. 5 depicts an example method for synthesizing computer-executable code. The method 500 includes performing, using one or more computing devices, the following operations:

At 502, the computing system can obtain one or more input tensors that each contain one or more input values and one or more output tensors that each contain one or more desired output values. For some implementations of the disclosure, the computing system may be configured to receive one or more additional inputs to refine and/or limit the search for expressions, operations, or both. As an example, the additional inputs can include a programming input such as a scalar constant, a computing operation, a description of an operation.

Further, while depicted using the term input tensor, the input is not limited solely to tensors, and the input type can include various data types including datatypes inclusive of multiple datatypes (e.g., a tensor). As depicted in the figure, a tensor is used to generally indicate that both simple and complex input data (e.g., input and output examples) can be obtained for use with implementations of the disclosure.

At 504, the computing system can access data that describes a plurality of performable operations included in the one or more software libraries. In general, the one or more software libraries can be comprehensive, such as including every function in a certain programming language or may be limited to only a subset of the functions included in the library. In some implementations, the one or more libraries can be limited to one programming language (e.g., Python). In certain implementations, the library can include a scientific computing library and/or machine-learning library such as: TensorFlow, PyTorch, NumPy, or a combination thereof.

At 506, the computing system can perform a search to identify one or more computer-executable expressions that each comprise a respective combination of one or more of the performable operations that, when performed on the one or more input tensors, produce the one or more output tensors. In some implementations, performing the search can include conducting a weighted enumerative search in which weights are respectively assigned to the performable operations. The weights can include at least two different weights having values that can be used to determine a search order for the set of performable operations. For example, in some implementations it may be desired to limit the computing cost of the computer executable expression. To indicate this, the weights may be determined based at least in part on the run-time of the performable operation. In some implementations, the weights can also be adjusted during the search. Thus, the weights may be learned through the identification of computer executable expressions and/or adjusted based on the identification of a computer executable expression(s).

Additional Disclosure

The technology discussed herein refers to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

In some implementations, the input tensors and the output tensors may be obtained by user data entry on a web site. In some implementations, the web site may include a user interface that comprises defined data entry fields that permit entry of the input tensors and the output tensors.

In some implementations, the searched libraries may be TensorFlow, PyTorch, and NumPy. In some implementations, the libraries can be searched individually or in any combination. In some implementations, all of the libraries are accessed and searched.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIGS. 2-5 respectively depict steps performed in a particular order for purposes of illustration and discussion, the methods of the present disclosure are not limited to the particularly illustrated order or arrangement. The various steps of the method depicted in FIG. 5 can be omitted, rearranged, combined, and/or adapted in various ways without deviating from the scope of the present disclosure.

What is claimed is:

1. A computer-implemented method for automated computer code synthesis, the computer-implemented method comprising:

obtaining, by one or more computing devices through a user interface, one or more input tensors, each input tensor comprising one or more input values, and a user textual description of one or more performable operations;

processing, by the one or more computing devices, the one or more input tensors and the user textual description of one or more performable operations with one or more machine-learned models to generate one or more computer-executable expressions, wherein each of the one or more computer-executable expressions comprises a respective combination of one or more of a plurality of performable operations included in one or more software libraries, and wherein each of the one or more computer-executable expressions perform the one or more performable operations of the user textual description when performed on the one or more input tensors; and providing, by the one or more computing devices, the one or more computer-executable expressions as an output to the user interface.

2. The computer-implemented method of claim 1, wherein the user interface is configured to receive an input comprising one or more tensor manipulation tasks.

3. The computer-implemented method of claim 1, wherein the user textual description comprises a natural language description.

4. The computer-implemented method of claim 3, further comprising:

obtaining the natural language description through the user interface; and processing the one or more input tensors along with one or more output tensors, each output tensor comprising one or more output values, and the natural language description with one or more machine-learned models to generate the one or more computer-executable expressions.

5. The computer-implemented method of claim 4, wherein processing the one or more input tensors and one or more output tensors and the natural language description with the one or more machine-learned models to generate the one or more computer-executable expressions comprises assigning, by a machine-learned model, a plurality of weights respectively to the performable operations based at least in part on the natural language description.

6. The computer-implemented method of claim 5, wherein the plurality of weights are assigned to the performable operations based, at least in part, on data types associated with the one or more input tensors.

7. The computer-implemented method of claim 5, wherein the plurality of weights are assigned to the performable operations based, at least in part, on a number of matched keywords between the performable operations and the user textual description.

8. The computer-implemented method of claim 1, wherein the user interface comprises at least one data entry field for entering the one or more input tensors and the user textual description.

9. The computer-implemented method of claim 1, wherein the output to the user interface comprises a list of the one or more computer-executable expressions.

10. The computer-implemented method of claim 1, further comprising:

presenting, on the user interface, a list of the one or more computer-executable expressions;

identifying at least one non-equivalent computer-executable expression from among the one or more computer-executable expressions; and displaying, on the user interface, a subset of input examples from among the one or more input tensors based on the at least one non-equivalent computer-executable expression.

11. The computer-implemented method of claim 1, further comprising:

receiving, by the user interface, a user input that selects a first expression of the one or more computer-executable expressions; and responsive to the user input, inserting the first expression into an existing set of computer-executable code developed by a user.

12. A computing system for automated computer code synthesis, the computing system comprising:

one or more processors; and one or more non-transitory computer-readable media that collectively store instructions that, when executed by the one or more processors, cause the computing system to perform operations, the operations comprising:

obtaining, via a user interface, one or more input tensors, wherein each input tensor comprising one or more input values, and a user textual description of one or more performable operations;

processing the one or more input tensors and the user textual description of one or more performable operations with one or more machine-learned models to generate one or more computer-executable expressions;

wherein each of the one or more computer-executable expressions comprises a respective combination of one or more of a plurality of performable operations included in one or more software libraries, and wherein each of the one or more computer-executable expressions perform the one or more performable operations of the user textual description when performed on the one or more input tensors; and providing the one or more computer-executable expressions as an output to the user interface.

13. The computing system of claim 12, wherein the user interface is configured to receive an input comprising one or more tensor manipulation tasks.

14. The computing system of claim 12, the operations further comprising:

obtaining the natural language description through the user interface; and processing the one or more input tensors along with one or more output tensors, each output tensor comprising one or more output values, and the natural language description with one or more machine-learned models to generate the one or more computer-executable expressions.

15. The computing system of claim 14, wherein processing the one or more input tensors and one or more output tensors and the natural language description with the one or more machine-learned models to generate the one or more computer-executable expressions comprises assigning, by a machine-learned model, a plurality of weights respectively to the performable operations based at least in part on the natural language description.

16. The computing system of claim 15, wherein the user textual description comprises a natural language description.

17. The computing system of claim 12, wherein the user interface comprises at least one data entry field for entering the one or more input tensors and the user textual description.

18. The computing system of claim 12, wherein the output to the user interface comprises a list of the one or more computer-executable expressions.

19. The computing system of claim 12, wherein the operations further comprise:

presenting, on the user interface, a list of the one or more computer-executable expressions;

identifying at least one non-equivalent computer-executable expression from among the one or more computer-executable expressions; and displaying, on the user interface, a subset of input examples from among the one or more input tensors based on the at least one non-equivalent computer-executable expression.

20. A non-transitory computer-readable medium storing instructions that, when executed by one or more computing devices, cause the one or more computing devices to perform operations for automated computer code synthesis, the operations comprising:

obtaining, by one or more computing devices through a user interface, one or more input tensors, each input tensor comprising one or more input values, and a user textual description of one or more performable operations;

processing, by the one or more computing devices, the one or more input tensors and the user textual description of one or more performable operations with one or more machine-learned models to generate one or more computer-executable expressions;

wherein each of the one or more computer-executable expressions comprises a respective combination of one or more of a plurality of performable operations included in one or more software libraries, and wherein each of the one or more computer-executable expressions perform the one or more performable operations of the user textual description when performed on the one or more input tensors; and providing, by the one or more computing devices, the one or more computer-executable expressions as an output to the user interface.

* * * * *